(12) United States Patent
Suzuki et al.

(10) Patent No.: US 12,489,875 B2
(45) Date of Patent: Dec. 2, 2025

(54) INFORMATION PROCESSING APPARATUS AND INFORMATION PROCESSING METHOD

(71) Applicant: SONY GROUP CORPORATION, Tokyo (JP)

(72) Inventors: Takaaki Suzuki, Tokyo (JP); Noriaki Takahashi, Tokyo (JP); Yuto Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 146 days.

(21) Appl. No.: 18/249,679

(22) PCT Filed: Oct. 14, 2021

(86) PCT No.: PCT/JP2021/038050
§ 371 (c)(1),
(2) Date: Apr. 19, 2023

(87) PCT Pub. No.: WO2022/091800
PCT Pub. Date: May 5, 2022

(65) Prior Publication Data
US 2023/0388472 A1    Nov. 30, 2023

(30) Foreign Application Priority Data

Oct. 27, 2020   (JP) .................................. 2020-179784

(51) Int. Cl.
*H04N 13/125*       (2018.01)
*G06T 5/10*         (2006.01)
(Continued)

(52) U.S. Cl.
CPC ............. *H04N 13/125* (2018.05); *G06T 5/10* (2013.01); *G06T 5/70* (2024.01); *G06T 7/13* (2017.01);
(Continued)

(58) Field of Classification Search
CPC ..... G06T 5/10; G06T 5/70; G06T 7/13; G09G 2320/0209; G09G 3/22; H04N 13/125; H04N 13/349; H04N 13/366
(Continued)

(56) References Cited

U.S. PATENT DOCUMENTS

| 2012/0057780 A1* | 3/2012 | Matsumoto ............ H04N 13/10 382/154 |
| 2013/0229498 A1* | 9/2013 | Yano .................... H04N 13/122 348/51 |

(Continued)

FOREIGN PATENT DOCUMENTS

| JP | 2000-004455 A | 1/2000 |
| JP | 2009507401 A | 2/2009 |

(Continued)

OTHER PUBLICATIONS

Oyamada, et al."Focal Pre-Correction of Projected Image for Deblurring on Displayed Image on the Screen", Proceedings of Meeting on Image Recognition and Understanding, MIRU, 2007, pp. 1295-1300.

(Continued)

*Primary Examiner* — Christopher S Kelley
*Assistant Examiner* — Ana Picon-Feliciano
(74) *Attorney, Agent, or Firm* — CHIP LAW GROUP

(57) ABSTRACT

An information processing apparatus includes a cost evaluation unit and a correction processing unit. The cost evaluation unit evaluates a correction residual after crosstalk correction processing as a cost. The correction processing unit performs a plurality of different pieces of crosstalk correction processing while determining a correction range and a correction amount based on the cost.

9 Claims, 21 Drawing Sheets

(51) Int. Cl.
    *G06T 5/70*     (2024.01)
    *G06T 7/13*     (2017.01)
    *G09G 3/22*     (2006.01)

(52) U.S. Cl.
    CPC ....... *G09G 3/22* (2013.01); *G09G 2320/0209* (2013.01)

(58) Field of Classification Search
    USPC .......................................................... 348/51
    See application file for complete search history.

(56) References Cited

U.S. PATENT DOCUMENTS

2014/0320599 A1    10/2014    Blonde
2016/0044305 A1    2/2016    Kim et al.

FOREIGN PATENT DOCUMENTS

| | | |
|---|---|---|
| JP | 2010193409 A | 9/2010 |
| JP | 2011-151783 A | 8/2011 |
| JP | 2011166744 A | 8/2011 |
| JP | 2013502151 A | 1/2013 |
| JP | 2013513332 A | 4/2013 |
| JP | 2013-183426 A | 9/2013 |
| JP | 2013-219643 A | 10/2013 |
| JP | 2014-032338 A | 2/2014 |
| JP | 2014-529954 A | 11/2014 |
| KR | 20120015006 A | 2/2012 |

OTHER PUBLICATIONS

International Search Report and Written Opinion of PCT Application No. PCT/JP2021/038050, issued on Dec. 28, 2021, 08 pages of ISRWO.

\* cited by examiner

FIG.10
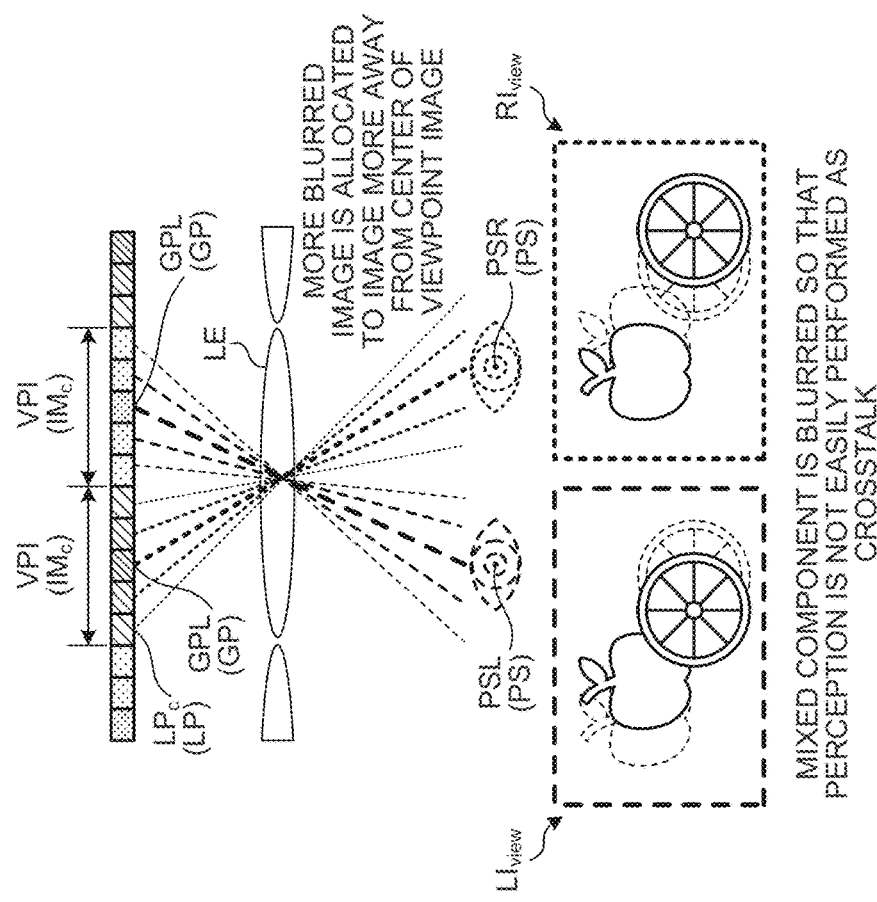
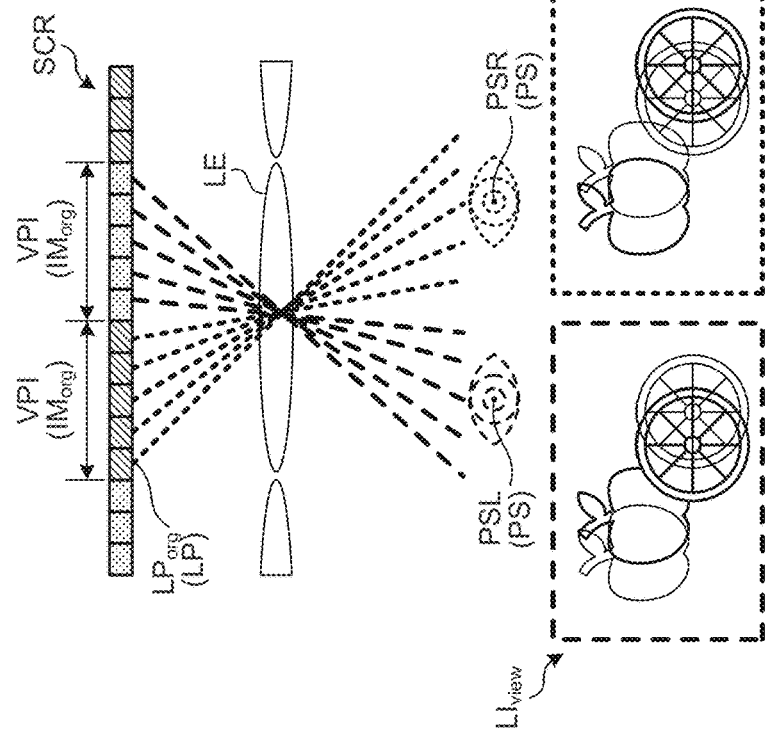

ALLOCATION OF PIXELS IN MULTI-VIEW IMAGE
OF THREE OR MORE VIEWPOINTS

ATTACHMENT OF PIXELS
IN CASE WHERE THERE
IS VERTICAL PARALLAX

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/038050 filed on Oct. 14, 2021, which claims priority benefit of Japanese Patent Application No. JP 2020-179784 filed in the Japan Patent Office on Oct. 27, 2020. Each of the above-referenced applications is hereby incorporated herein by reference in its entirety.

FIELD

The present invention relates to an information processing apparatus, an information processing method, and a program.

BACKGROUND

A display device for displaying a stereoscopic image and a multi-view image has a problem of image deterioration due to crosstalk. Therefore, there has been proposed a technique for inhibiting crosstalk by inverse correction processing of performing conversion inverse to conversion caused by the crosstalk.

CITATION LIST

Patent Literature

Patent Literature 1: JP 2013-183426 A

Non Patent Literature

Non Patent Literature 1: MIRU2007, "Focal Pre-Correction of Projected Image for Deblurring on Displayed Image on the Screen."

SUMMARY

Technical Problem

In inverse correction processing, image processing of reducing a signal value of a pixel whose luminance increases due to crosstalk and increasing a signal value of a pixel whose luminance decreases is performed. A gradation range of the image is, however, limited to 0 to 255. For a pixel whose signal value is reduced or increased beyond the saturation constraint, the signal value is clipped to 0 or 255. In a region where the signal value exceeds the saturation constraint, an image is not sufficiently corrected, and it is difficult to satisfactorily inhibit crosstalk.

Therefore, the present disclosure proposes an information processing apparatus, an information processing method, and a program capable of satisfactorily inhibiting crosstalk.

Solution to Problem

According to the present disclosure, an information processing apparatus is provided that comprises: a cost evaluation unit that evaluates a correction residual after crosstalk correction processing as a cost; and a correction processing unit that performs a plurality of different pieces of crosstalk correction processing while determining a correction range and a correction amount based on the cost. According to the present disclosure, an information processing method in which an information process of the information processing apparatus is executed by a computer, and a program for causing the computer to execute the information process of the information processing apparatus, are provided.

BRIEF DESCRIPTION OF DRAWINGS

FIG. 10 illustrates one example of blurring processing.

DESCRIPTION OF EMBODIMENTS

An embodiment of the present disclosure will be described in detail below with reference to the drawings. In the following embodiment, the same reference signs are attached to the same parts to omit duplicate description.

Note that the description will be given in the following order.

[1. Outline of Multistage Crosstalk Correction Processing]
[2. Configuration of Information Processing Apparatus]

[3. Crosstalk Correction Processing]
[3-1. Inverse Correction Processing]
[3-2. Compression Processing]
[3-3. Blurring Processing]
[4. Specific Example of Multistage Crosstalk Correction Processing]
[5. Effects]
[6. Variations]
[6-1. First Variation]
[6-2. Second Variation]
[6-3. Third Variation]
[6-4. Fourth Variation]
[6-5. Fifth Variation]

[1. Outline of Multistage Crosstalk Correction Processing]

Figure 1:
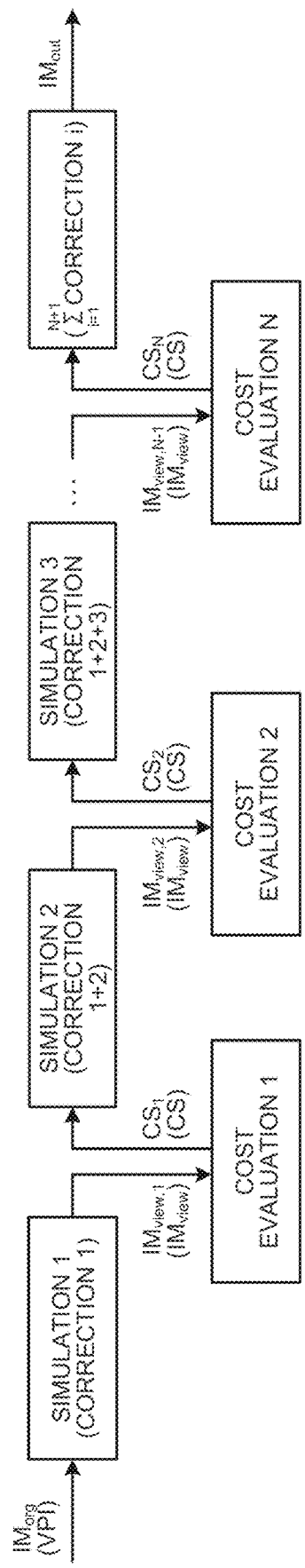
FIG. 1 outlines multistage crosstalk correction processing.

FIG. 1 outlines multistage crosstalk correction processing.

The present disclosure proposes a method of performing a plurality of pieces of crosstalk correction processing in a multi-layered manner by repeating simulation of a perceptual image $IM_{view}$ and cost evaluation. In the simulation, the perceptual image $IM_{view}$ of an observer after crosstalk correction processing is simulated. In the perceptual image $IM_{view}$, a plurality of viewpoint images VPI after the crosstalk correction processing is mixed by crosstalk. In the cost evaluation, a correction residual after the crosstalk correction processing is evaluated as a cost CS based on a simulation result.

The correction residual is generated by, for example, saturation of a signal value caused by the crosstalk correction processing and a side effect on image quality caused by the crosstalk correction processing. The side effect means, for example, a blur of an image caused by blurring processing and a decrease in contrast caused by compression of a luminance range. The correction residual is calculated as, for example, a difference between an image to be originally displayed (original image $IM_{org}$) and the perceptual image $IM_{view}$ after the crosstalk correction processing.

A correction range and a correction amount of a subsequent piece of crosstalk correction processing are determined based on the cost CS obtained by the latest cost evaluation. In the example of FIG. 1, the simulation and the cost evaluation are performed N times each (N is integer of two or more). In the i-th simulation (i is integer from 1 to N), a perceptual image $IM_{view,i}$ obtained by performing the first to i-th i pieces of crosstalk correction processing on the original image $IM_{org}$ is simulated. In the i-th cost evaluation, a cost $CS_i$ for the perceptual image $IM_{view,i}$ is evaluated.

A correction range and a correction amount of the (i+1)th crosstalk correction processing are determined based on the cost $CS_i$. The correction range and the correction amount are determined such that a cost $CS_{i+1}$ after the crosstalk correction processing is smaller than the cost $CS_i$ obtained by the latest cost evaluation. The (i+1)th crosstalk correction processing is performed based on the determined correction range and correction amount. In this manner, the plurality of pieces of crosstalk correction processing is performed while the correction range and the correction amount are determined to reduce the cost CS.

[2. Configuration of Information Processing Apparatus]

Figure 2:
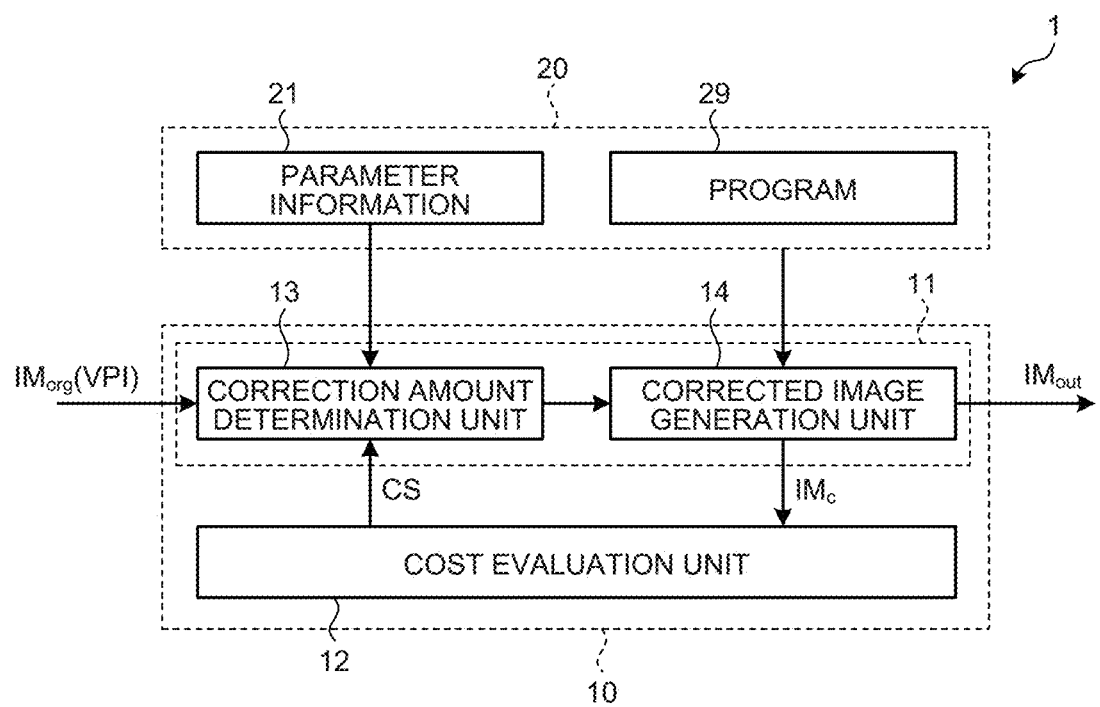
FIG. 2 illustrates one example of an information processing apparatus.

FIG. 2 illustrates one example of an information processing apparatus 1 for performing the above-described multistage crosstalk correction processing.

The information processing apparatus 1 includes a processing device 10 and a storage device 20. The crosstalk correction processing of the present disclosure can be applied to crosstalk between two viewpoints and crosstalk between three or more multiple viewpoints. A three-dimensional (3D) display is known as a display for two viewpoints. An example in which the multistage crosstalk correction processing of the present disclosure is applied to the 3D display will be described below.

The processing device 10 includes a correction processing unit 11 and a cost evaluation unit 12.

The correction processing unit 11 performs a plurality of pieces of crosstalk correction processing on the original image $IM_{org}$ to generate an output image $IM_{out}$. The original image $IM_{org}$ includes a plurality of viewpoint images VPI. In the present embodiment, 3D display is performed, and the original image $IM_{org}$ thus includes a left eye original image $LI_{org}$ and a right eye original image $RI_{org}$ as the plurality of viewpoint images VPI.

The correction processing unit 11 includes a correction amount determination unit 13 and a corrected image generation unit 14.

The correction amount determination unit 13 determines the correction range and the correction amount of the subsequent piece of crosstalk correction processing based on the cost CS obtained by the latest cost evaluation. The correction amount determination unit 13 determines that there is a correction residual when the correction residual is larger than a preset residual threshold. The correction amount determination unit 13 determines an image region determined to have a correction residual as a correction range, and determines the correction amount in accordance with the magnitude of the correction residual.

For example, the correction amount determination unit 13 determines the correction range and the correction amount of the (i+1)th crosstalk correction processing based on the cost $CS_i$ obtained by the i-th cost evaluation. The correction amount determination unit 13 acquires a parameter necessary for the crosstalk correction processing from the storage device 20. The storage device 20 stores the parameter required for the crosstalk correction processing as parameter information 21.

The corrected image generation unit 14 performs the subsequent crosstalk correction processing to generate a corrected image $IM_c$. The corrected image generation unit 14 holds the corrected image $IM_c$ generated by the latest crosstalk correction processing until the subsequent crosstalk correction processing is performed. The corrected image generation unit 14 generates a new corrected image $IM_c$ by performing the subsequent crosstalk correction processing on the held latest corrected image $IM_c$.

For example, the corrected image generation unit 14 stores a corrected image $IM_{c,i}$ generated by the i-th crosstalk correction processing until the (i+1)th crosstalk correction processing is performed. The corrected image $IM_{c,i}$ corresponds to the corrected image $IM_c$ obtained by performing the first to i-th i pieces of crosstalk correction processing on the original image $IM_{org}$. A corrected image $IM_{c,i+1}$ obtained by performing the first to (i+1)th (i+1) pieces of crosstalk correction processing on the original image $IM_{org}$ is generated by performing the (i+1)th crosstalk correction processing on the corrected image $IM_{c,i}$.

The cost evaluation unit 12 simulates the perceptual image $IM_{view,i}$ of the observer after the i-th crosstalk correction processing based on the corrected image $IM_{c,i}$ obtained by the i-th crosstalk correction processing. The cost evaluation unit 12 evaluates a correction residual after the i-th crosstalk correction processing as the cost $CS_i$ based on a simulation result. In this manner, the correction processing unit 11 performs a plurality of different pieces of crosstalk correction processing while determining the correction range and the correction amount based on the cost CS.

For example, three or more (N+1) pieces of crosstalk correction processing are performed. The correction processing unit 11 performs a plurality of pieces of crosstalk correction processing within a range in which the number of pieces of crosstalk correction processing does not exceed a preset number in order to balance the image quality of the perceptual image $IM_{view}$ and an operation load.

[3. Crosstalk Correction Processing]

One example of the crosstalk correction processing used in information processing of the present disclosure will be described below. The correction processing unit 11 performs, for example, inverse correction processing, compression processing, and blurring processing as the crosstalk correction processing.

[3-1. Inverse Correction Processing]

Figure 3:
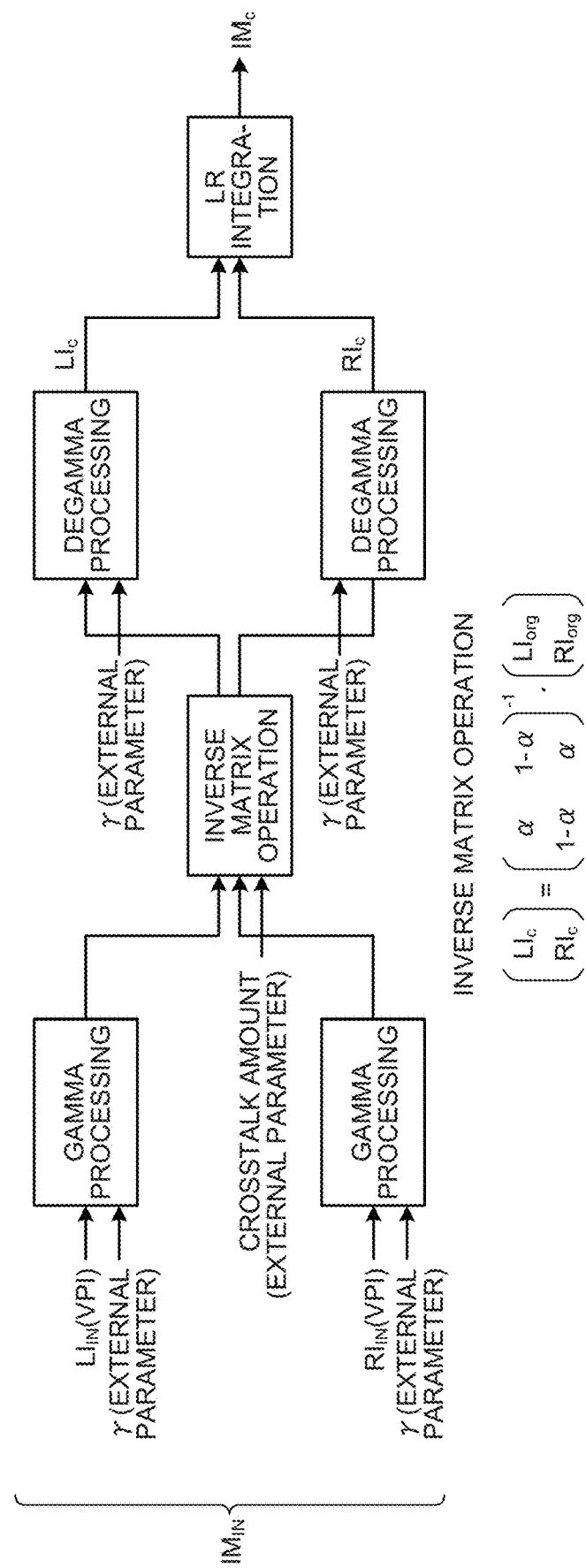
FIG. 3 illustrates one example of inverse correction processing.
Figure 4:
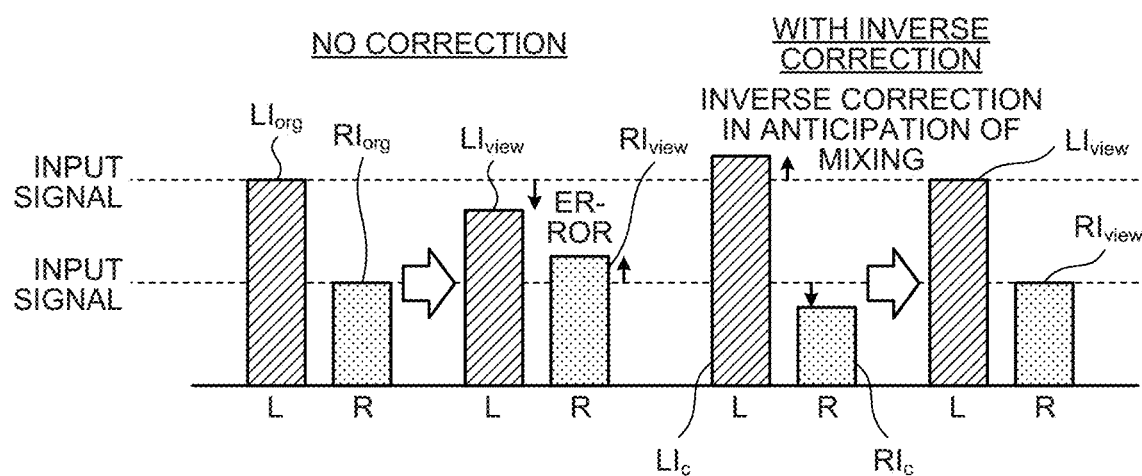
FIG. 4 illustrates one example of the inverse correction processing.

FIGS. 3 and 4 illustrate one example of the inverse correction processing.

The inverse correction processing is crosstalk correction processing of performing conversion inverse to conversion caused by crosstalk on an input image $IM_{IN}$. The input image $IM_{IN}$ is the original image $IM_{org}$ or the corrected image $IM_c$. In the example of FIG. 3, a linear mixture model is used as a crosstalk model. In the linear mixture model, a left eye input image $LI_{IN}$ and a right eye input image $RI_{IN}$ are mixed at a mixing ratio α. The crosstalk model is, however, not limited to that in FIG. 3. The crosstalk model may be constructed based on a non-linear mixture model. In the non-linear mixture model, a range in which crosstalk is generated is expanded.

In the crosstalk model in FIG. 3, gamma processing, mixing processing, and degamma processing are sequentially performed on input signals of the left eye input image $LI_{IN}$ and the right eye input image $RI_{IN}$. The mixing processing is represented by a 4×4 determinant. Therefore, in the inverse correction processing, inverse matrix operation processing using an inverse matrix of the determinant is performed. The correction processing unit 11 sequentially performs the gamma processing, the inverse matrix operation processing, and the degamma processing on the left eye input image $LI_{IN}$ and the right eye input image $RI_{IN}$ to generate a left eye corrected image $LI_c$ and a right eye corrected image $RI_c$. The correction processing unit 11 integrates the left eye corrected image $LI_c$ and the right eye corrected image $RI_c$, and outputs the integrated image as the corrected image $IM_c$.

The storage device 20 stores information of a gamma value γ and the mixing ratio α as the parameter information 21. The gamma value γ is used in the gamma processing and the degamma processing. The mixing ratio α is used in the inverse matrix operation processing. When performing the inverse correction processing, the correction processing unit 11 acquires the information of the mixing ratio α and the gamma value γ in the parameter information 21 from the storage device 20.

The left side of FIG. 4 illustrates an example in which the inverse correction processing is not performed. In the example of FIG. 4, an input signal of the left eye input image $LI_{IN}$ is larger than an input signal of the right eye input image $RI_{IN}$. Therefore, generation of crosstalk increases inflow of input signals from the left eye side to the right eye side. As a result, the luminance of a left eye perceptual image $LI_{view}$ becomes smaller than that of the left eye original image $LI_{org}$, and the luminance of a right eye perceptual image $RI_{view}$ becomes larger than that of the right eye original image $RI_{org}$.

The right side of FIG. 4 illustrates an example in which the inverse correction processing is performed. In the crosstalk, input signals on the left eye side decreases, and input signals on the right eye side increases. Therefore, in the inverse correction processing, signal processing is performed to increase the input signals on the left eye side and decrease the input signals on the right eye side. When crosstalk occurs between the left eye corrected image $LI_c$ and the right eye corrected image $RI_c$ after the inverse correction processing, a change of a signal value caused by the inverse correction processing and a change of perception luminance caused by the crosstalk cancel each other. As a result, the luminance of the left eye perceptual image $LI_{view}$ becomes equal to that of the left eye input image $LI_{IN}$, and the luminance of the right eye perceptual image $RI_{view}$ becomes equal to that of the right eye input image $RI_{IN}$. This cancels the crosstalk.

[3-2. Compression Processing]

FIGS. 5 to 9 illustrate one example of the compression processing.

Figure 6:
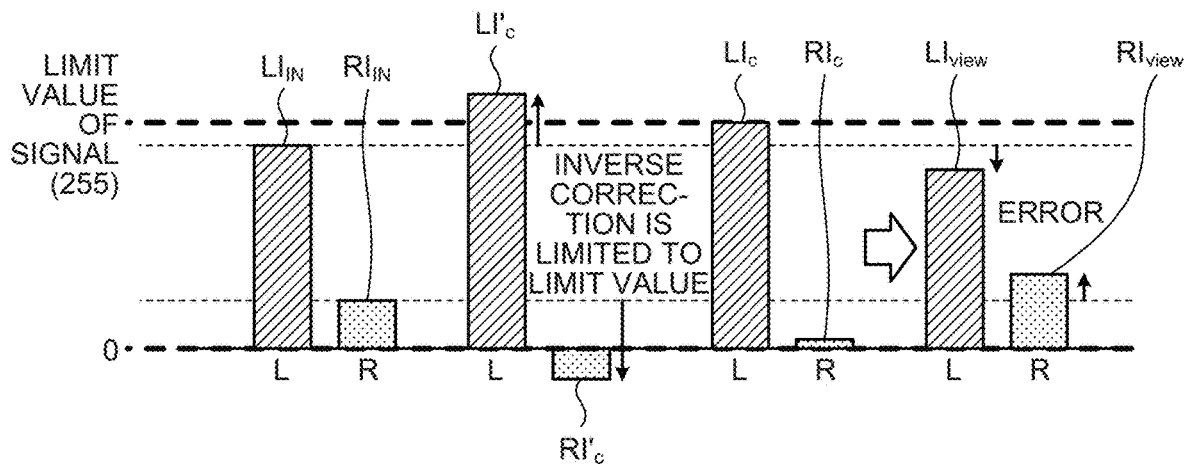
FIG. 6 illustrates one example of the compression processing.

The compression processing is crosstalk correction processing of compressing the luminance range of a correction range. In the inverse correction processing in FIG. 4, the contrast between the viewpoint images VPI is not large, so that the signal value after the inverse correction processing does not exceed a limit value (e.g., gradation range of 0 to 255) of the signal. As illustrated in FIG. 6, however, when the contrast between the viewpoint images VPI increases, the signal value after the inverse correction processing may exceed the limit value.

When the signal value after the inverse correction processing exceeds an upper limit value (255) or a lower limit value (0) of the signal, the signal value after the inverse correction processing is clipped to the upper limit value or the lower limit value of the signal. In the example of FIG. 6, the inverse correction processing causes the signal value of the left eye corrected image $LI_c$, to exceed the upper limit value, and causes the signal value of the right eye corrected image $RI_c$, to fall below the lower limit value. Therefore, the left eye corrected image $LI_c$ and the right eye corrected image $RI_c$, in which the signal values are changed to the upper limit value and the lower limit value, are generated by clipping. As a result, the luminance of the left eye perceptual image $LI_{view}$ becomes smaller than that of the left eye input image $LI_{IN}$, and the luminance of the right eye perceptual image $RI_{view}$ becomes larger than that of the right eye input image $RI_{IN}$.

Figure 7:
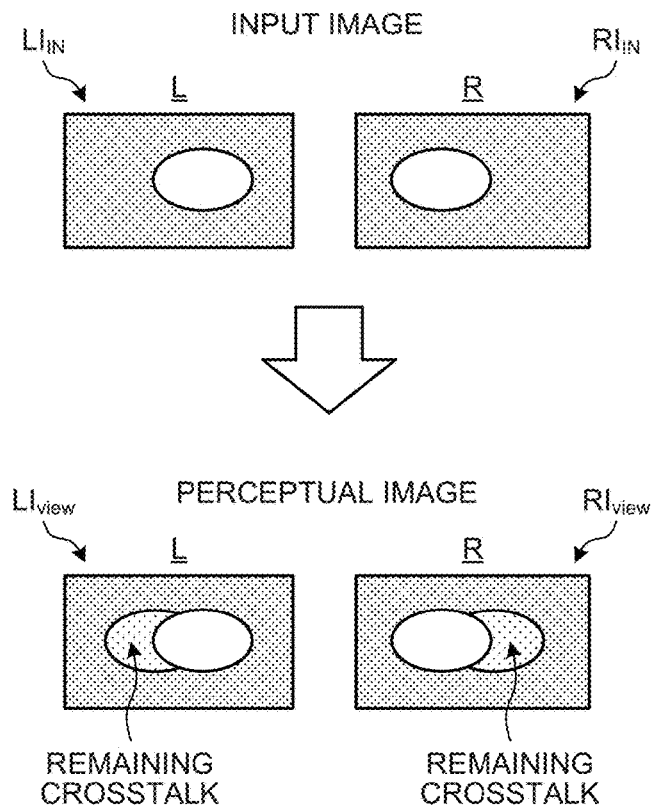
FIG. 7 illustrates one example of the compression processing.

When the signal value changes due to clipping, the change of a signal value caused by the inverse correction processing and the change of perception luminance caused by the crosstalk do not cancel each other. Therefore, as illustrated in FIG. 7, the crosstalk remains. The right eye input image $RI_{IN}$ appears as a ghost in the left eye perceptual image $LI_{view}$, and the left eye input image $LI_{IN}$ appears as a ghost in the right eye perceptual image $RI_{view}$. Therefore, the correction processing unit 11 compresses the luminance range of the input signal so that clipping does not occur.

Figure 8:
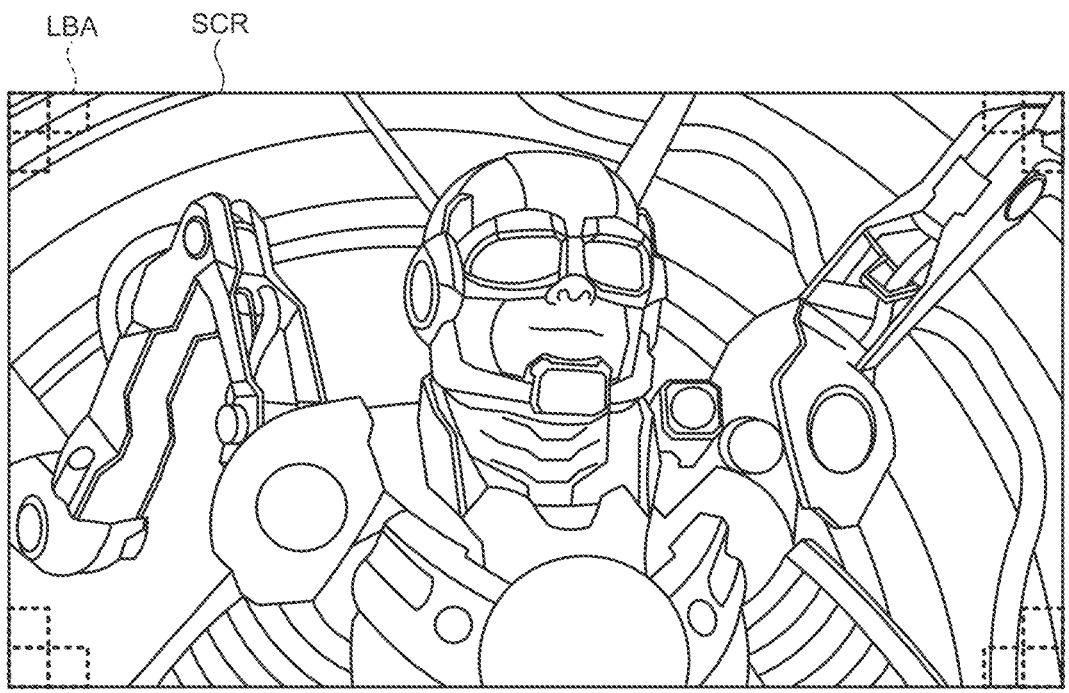
FIG. 8 illustrates one example of the compression processing.

As illustrated in FIG. 8, the correction processing unit 11 divides the input image $IM_{IN}$ into a plurality of local regions LBA. Although a local region LBA is set as, for example, a rectangular region of 64×64 pixels, the size of the local region LBA is not limited thereto.

The correction processing unit 11 calculates signal values after the inverse correction processing for all the pixels in the local region LBA. The correction processing unit 11 calculates a signal value of a portion exceeding the limit value as a saturation value for a pixel whose signal value after the inverse correction processing exceeds the limit value. For example, the correction processing unit 11 calculates a saturation value of a portion exceeding the upper limit value of the signal as a positive value, and calculates a saturation value of a portion falling below the lower limit value of the signal as a negative value.

Figure 9:
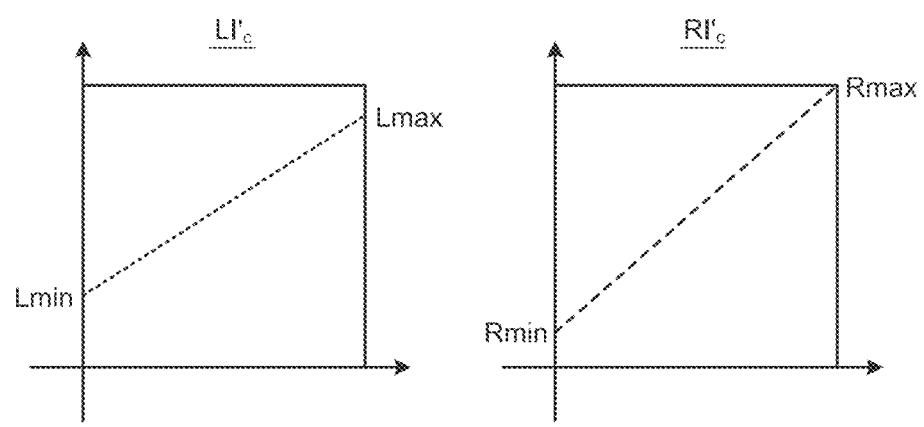
FIG. 9 illustrates one example of the compression processing.

As illustrated in FIG. 9, the correction processing unit 11 calculates a maximum value $L_{max}$ and a minimum value $L_{min}$ of a saturation value of the left eye corrected image $LI_c$, and a maximum value $R_{max}$ and a minimum value $R_{min}$ of a saturation value of the right eye corrected image $RI_c$, as range parameters for each local region LBA. The correction processing unit 11 selects one or more local regions LBA including a pixel whose signal value is saturated. The correction processing unit 11 determines a compression amount of a luminance range as a correction amount of compression processing for each selected local region LBA. In the luminance range, the inverse correction processing does not cause signal values of all the pixels in the local region LBA to exceed the limit value. For example, the larger one of $L_{max}$ and $R_{max}$ is defined as $LR_{max}$, and the smaller one of $L_{min}$ and $R_{min}$ is defined as $LR_{min}$. The correction processing unit 11 calculates a compression amount C as $C=(255+LR_{max}-LR_{min})/255$. The correction processing unit 11 performs compression processing on the luminance range of each selected local region LBA based on the determined compression amount. The correction processing unit 11 does not perform the compression processing on the local region LBA not including a pixel whose signal value is saturated.

Figure 5:
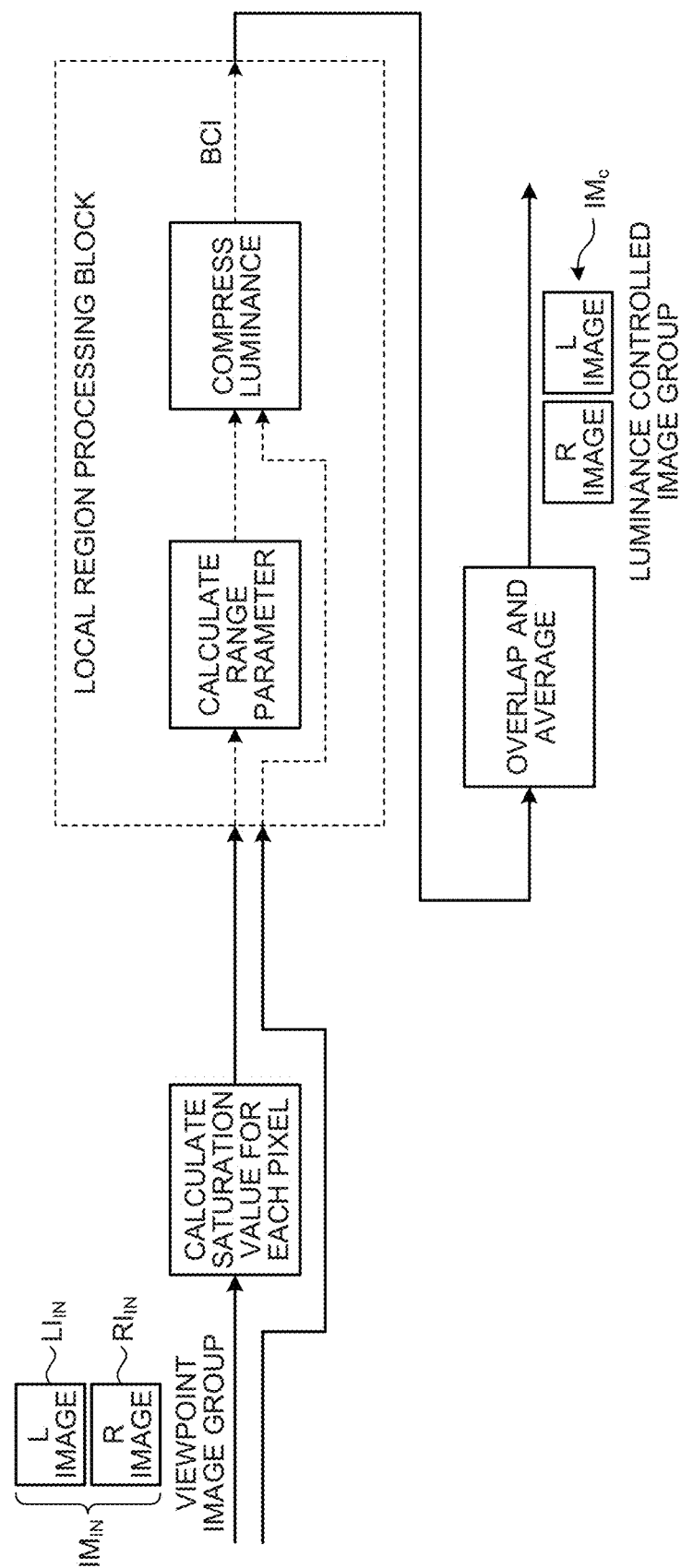
FIG. 5 illustrates one example of compression processing.

As illustrated in FIG. 5, the correction processing unit 11 generates a local luminance compressed image BCI obtained by performing compression processing on one or more local regions LBA for the input image $IM_{IN}$. In the local luminance compressed image BCI, a luminance step is generated at a boundary portion between local regions LBA having a different luminance range. Therefore, the correction processing unit 11 generates a plurality of local luminance compressed images BCI in which the luminance range is adjusted to a range not saturated by the inverse correction processing for each local region LBA while shifting a division position of the input image $IM_{IN}$. The correction processing unit 11 overlaps and averages the plurality of local luminance compressed images BCI. As a result, the corrected image $IM_c$ obtained by combining the plurality of local luminance compressed images BCI is generated. In the corrected image $IM_c$, the luminance step between the local regions LBA is reduced. The parameter information 21 includes information on the size of the local region LBA and a setting position of the local region LBA (division position of input image $IM_{IN}$).

[3-3. Blurring Processing]

FIGS. 10 to 14 illustrate one example of blurring processing.

The blurring processing is crosstalk correction processing of blurring an outer edge of the viewpoint image VPI away from the center portion (gaze point of observer) of the viewpoint image VPI in a parallax direction. "Blurring" means making an unclear view. The blurring processing include smoothing processing using a Gaussian filter, mosaic processing, and level correction processing of lowering a signal value to darken an outer edge.

As illustrated in FIG. 10, a plurality of viewpoint images VPI is arranged in the parallax direction on a screen SCR. Parallax occurs in the parallax direction. For example, an extending direction of a line obtained by projecting a line connecting a right eye and a left eye of an observer onto the screen SCR is the parallax direction. One viewpoint image VPI includes a plurality of line images LP adjacent in the parallax direction. One viewpoint image VPI has a width corresponding to those of the plurality of line images.

In the example on the left side of FIG. 10, a plurality of line images $LP_{org}$ in the original image $IM_{org}$ is allocated to one viewpoint image VPI. Since the line images $LP_{org}$ not subjected to the crosstalk correction processing are displayed as it is, crosstalk is strongly recognized in the left eye perceptual image $LI_{view}$ and the right eye perceptual image $RI_{view}$.

In the example on the right side of FIG. 10, a plurality of line images $LP_c$ in the corrected image $IM_c$ is allocated to one viewpoint image VPI. The blurring processing is performed on the corrected image $IM_c$. Since the image subjected to the blurring processing is mixed by crosstalk, the crosstalk is not easily recognized in the left eye perceptual image $LI_{view}$ and the right eye perceptual image $RI_{view}$.

For example, the correction processing unit 11 acquires viewpoint position information detected by head tracking. The viewpoint position information includes coordinate information of a viewpoint position PS at which the viewpoint image VPI is observed. For example, a viewpoint position PS (left eye viewpoint position PSL) at which a left eye viewpoint image VPI (left eye corrected image $LI_c$ is observed is the center of the pupil of the left eye. A viewpoint position PS (right eye viewpoint position PSR) at which a right eye viewpoint image VPI (right eye corrected image $RI_c$) is observed is the center of the pupil of the right eye.

The correction processing unit 11 detects a gaze point GP on the viewpoint image VPI corresponding to the viewpoint position PS. The gaze point GP is detected by following a path of light incident on the viewpoint position PS. A left eye gaze point GPL is located at the center of the left eye viewpoint image VPI. A right eye gaze point GPR is located at the center of the right eye viewpoint image VPI. The correction processing unit 11 selectively blurs one or more line images LP, in which the gaze point GP is not located, among the plurality of adjacent line images LP.

Light emitted from the outer edge of the viewpoint image VPI is incident on a position shifted from the center of the pupil. Therefore, the line image LP of the outer edge of the viewpoint image VPI is hardly recognized by the observer. Light, however, may spread due to an influence of aberration of a lens LE and the like, and the line image LP of the outer edge may be recognized as a crosstalk component. In the present disclosure, central portions of the viewpoint images VPI recognized as a left eye image and a right eye image are referred to as direct viewpoints, and positions other than the direct viewpoints are referred to as intermediate viewpoints. The line images LP of the intermediate viewpoints are not easily recognized as the left eye image and the right eye image. Therefore, the correction processing unit 11 selectively blurs the line images LP of the intermediate viewpoints.

Figure 11:
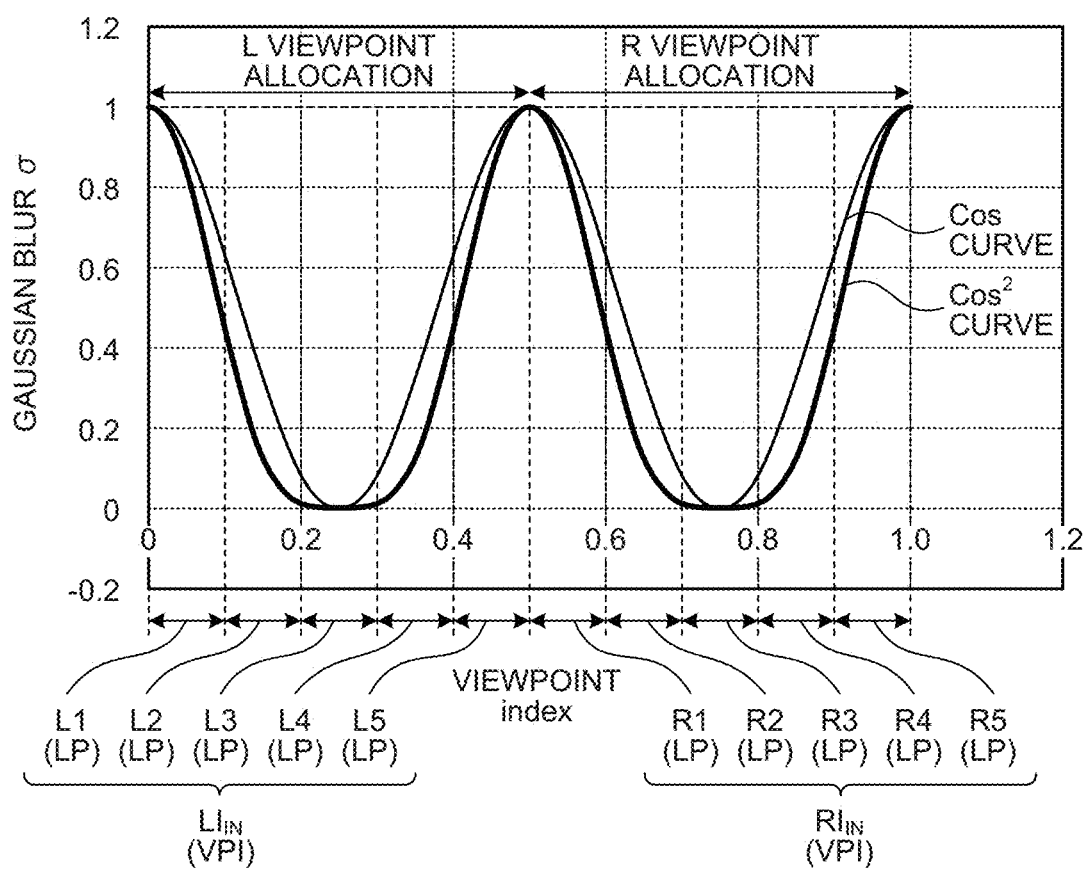
FIG. 11 illustrates one example of the blurring processing.

As illustrated in FIG. 11, the correction processing unit 11 varies the size of a blur of the line image LP in accordance with a distance from the gaze point GP, for example. In FIG. 11, each of viewpoint indexes L1 to L5 is attached to each of five line images LP in the left eye input image $LI_{IN}$. A viewpoint index L3 is a direct viewpoint of the left eye, and viewpoint indexes L1, L2, L4, and L5 are intermediate viewpoints of the left eye. Each of viewpoint indexes R1 to R5 is attached to each of five line images LP in the right eye input image $RI_{IN}$. A viewpoint index R3 is a direct viewpoint of the right eye, and viewpoint indexes R1, R2, R4, and R5 are intermediate viewpoints of the right eye.

For example, Gaussian blurring is adopted as the blurring processing. The size of a blur is represented by a standard deviation σ. The correction processing unit 11 blurs a line image LP more greatly as the line image LP is located farther from the gaze point GP. The size of a blur (standard deviation σ) is represented by a monotonic function that monotonically increases from the center of the viewpoint image VPI toward an end of the viewpoint image VPI. In the example of FIG. 11, the monotonic function is represented by a cosine curve or a cosine square curve. The monotonic function is, however, not limited thereto. The parameter information 21 includes information on the correspondence relation between a viewpoint index and a size of a blur.

Figure 12:
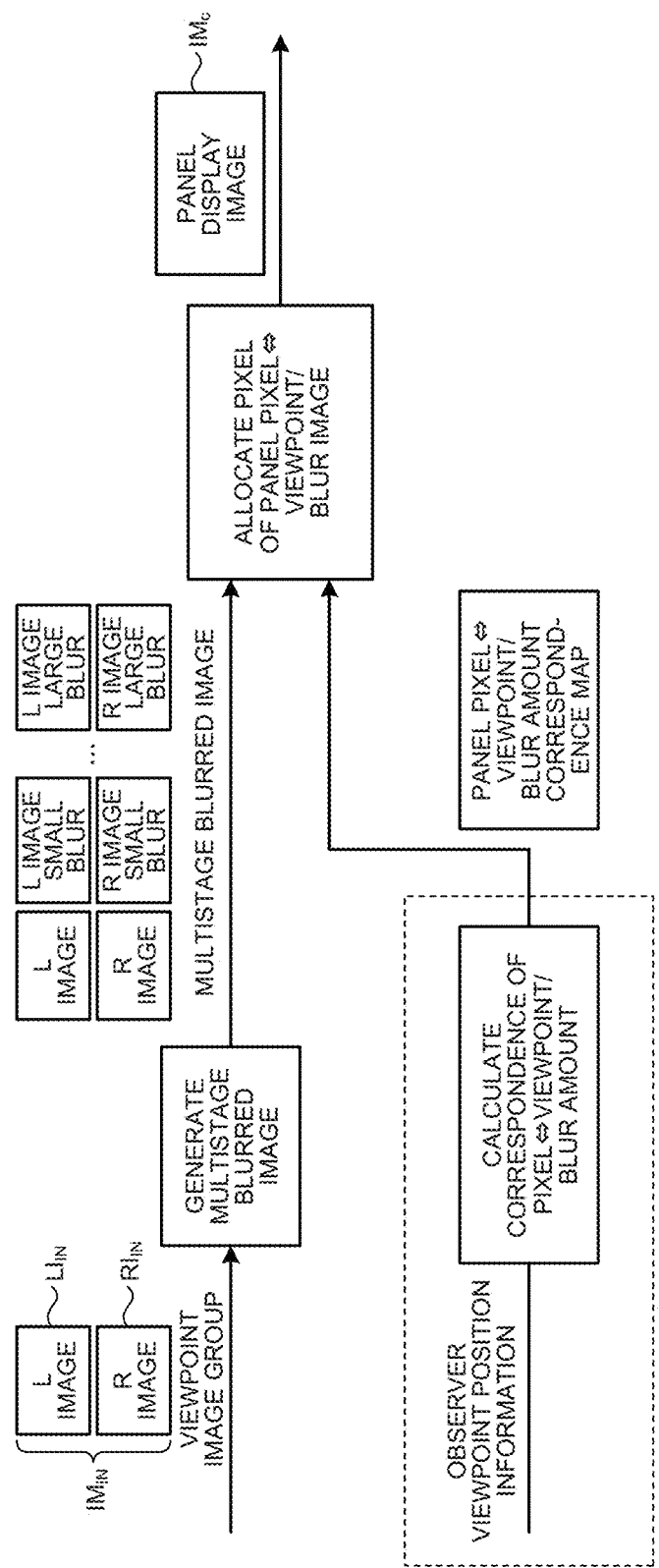
FIG. 12 illustrates one example of the blurring processing.

As illustrated in FIG. 12, the correction processing unit 11 determines the correspondence relation between a pixel group of the screen SCR and each viewpoint image VPI, allocation of viewpoint indexes in a viewpoint image VPI, and distribution of the size of a blur (blur amount) in the viewpoint image VPI based on viewpoint position information of the observer. The correction processing unit 11 generates a multistage blurred image, and outputs the multistage blurred image as the corrected image $IM_c$ based on the determined information. In the multistage blurred image, the blur amount is controlled in multiple stages in accordance with the distance from the gaze point GP.

Figure 13:
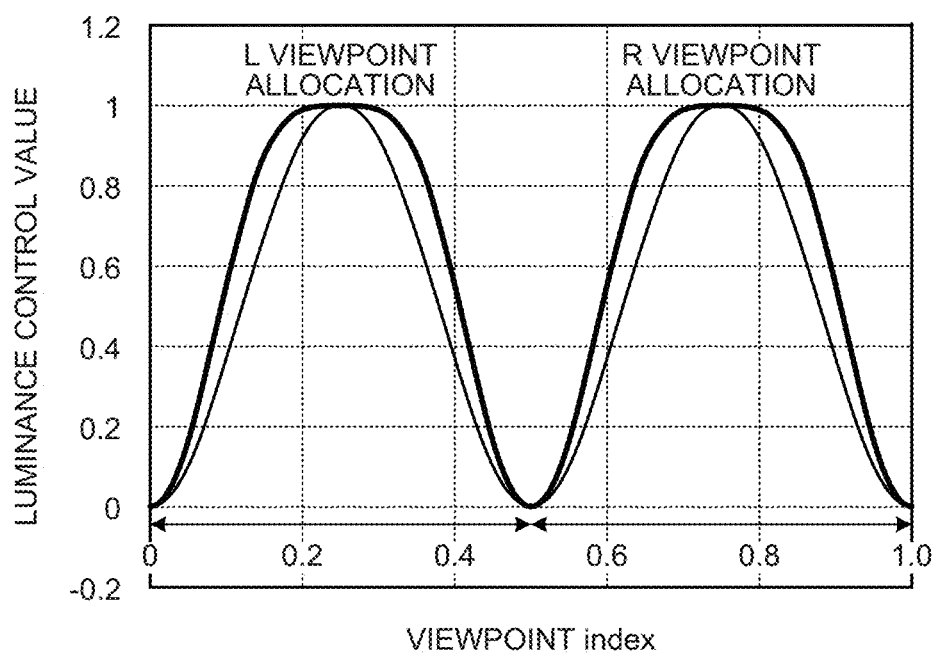
FIG. 13 illustrates one example of the blurring processing.

Although, in FIG. 11, Gaussian blurring is used as the blurring processing, the blurring processing is not limited thereto. For example, as illustrated in FIG. 13, the outer edge of the viewpoint image VPI can be made less noticeable than the central portion by reducing the luminance of the line image LP of the intermediate viewpoint. For example, the size of a blur is defined as a luminance control value of the line image LP. The luminance control value is represented by a monotonic function that monotonically increases from the center of the viewpoint image VPI toward an end of the viewpoint image VPI. The correction processing unit 11 reduces signal values of all the pixels in the line image LP by the luminance control value. The parameter information 21 includes information on the luminance control value.

Figure 14:
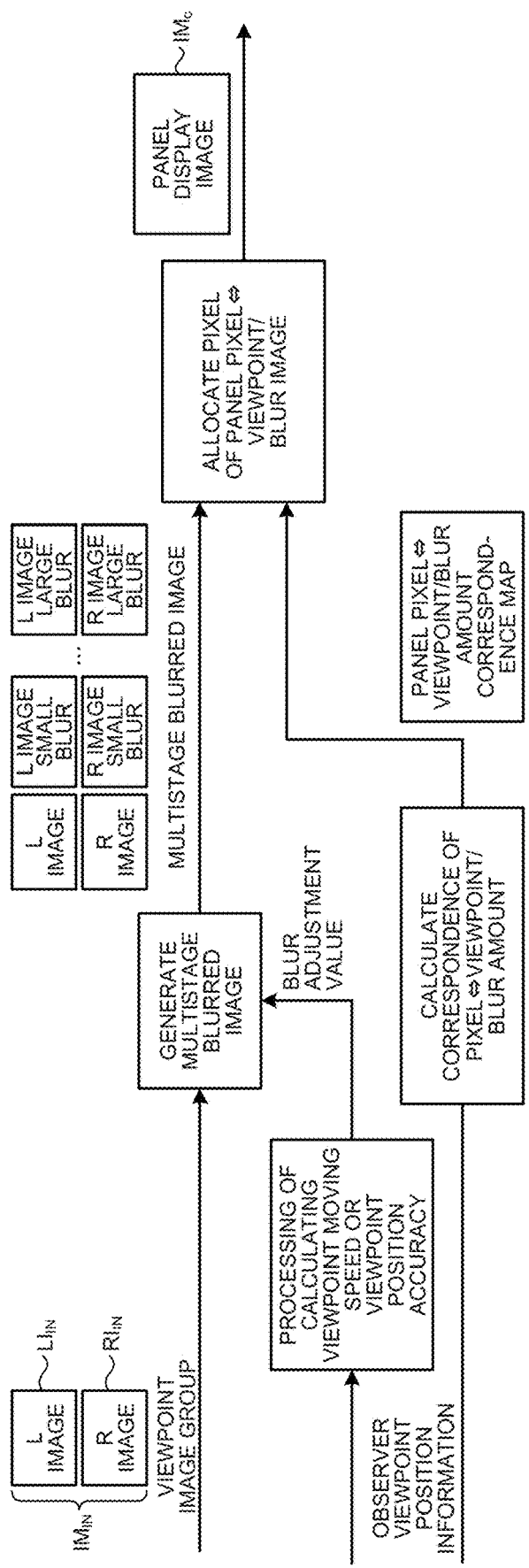
FIG. 14 illustrates one example of the blurring processing.

The correction processing unit 11 changes the corrected image $IM_c$ in accordance with timing when the viewpoint position PS of the observer (head of observer) moves so that an image with no blur is displayed at the gaze point GP. When a moving speed of the viewpoint position PS is large, however, the change of the corrected image $IM_c$ is not in time, and the observer may strongly recognize the line image LP (blurred image) of the intermediate viewpoint. Therefore, as illustrated in FIG. 14, the correction processing unit 11 can vary the distribution of the blur amount in a viewpoint image VPN in accordance with the moving speed of the viewpoint position PS.

For example, one or more thresholds are set for the moving speed of the viewpoint position PS. A blur adjustment value is set for each threshold. The blur adjustment value is represented by a monotonic function that monotonically increases with an increase in the moving speed of the viewpoint position PS. When the moving speed of the viewpoint position PS is larger than the threshold, the correction processing unit 11 reduces the blur amounts of the line images LP of all the intermediate viewpoints by the blur adjustment value corresponding to the threshold. As the moving speed of the viewpoint position PS increases, the correction amount (blur amount) of the blurring processing decreases. The parameter information 21 includes information on the threshold and the blur adjustment value.

Even when the measurement accuracy of the viewpoint position PS in the head tracking is low, a similar problem may occur. Therefore, the correction processing unit 11 may set a blur adjustment value for each measurement accuracy of the viewpoint position PS, and vary the distribution of the blur amount in the viewpoint image VPN in accordance with the measurement accuracy.

[4. Specific Example of Multistage Crosstalk Correction Processing]

FIGS. 15 to 19 illustrate one example of the multistage crosstalk correction processing. A processing flow in FIGS. 15 and 19 will be described below with reference to FIGS. 16 to 18.

In Step S1, the correction processing unit 11 performs inverse correction processing on the original image $IM_{org}$ to generate the corrected image $IM_c$. The inverse correction processing in Step S1 is performed to simulate the perceptual image $IM_{view}$ after the inverse correction processing, and is not performed to generate the output image $IM_{out}$.

In Step S2, the cost evaluation unit 12 simulates the perceptual image $IM_{view}$ after the inverse correction processing. The cost evaluation unit 12 evaluates a correction residual after inverse correction processing as the cost CS based on a simulation result.

In Step S3, the correction processing unit 11 determines a correction range and a correction amount of the blurring processing based on the cost CS obtained by the cost evaluation after the inverse correction processing. The correction processing unit 11 performs the blurring processing on the original image $IM_{org}$ based on the determined correction range and correction amount.

Figure 16:
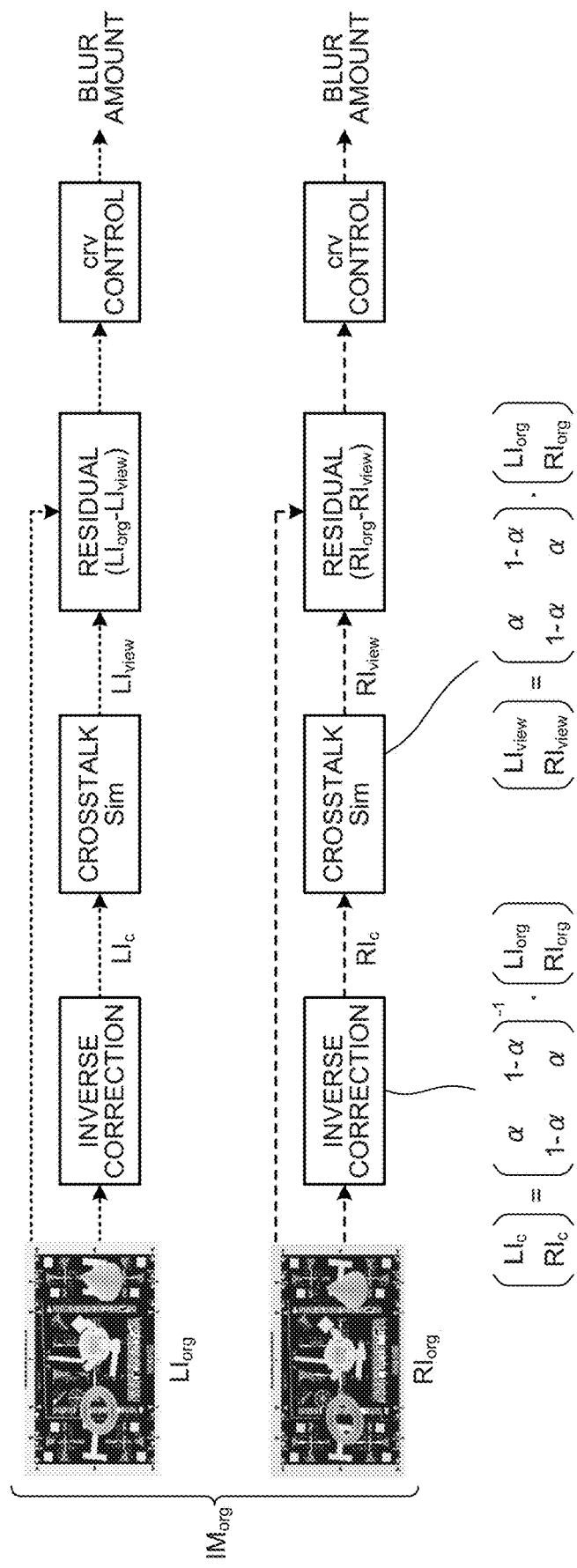
FIG. 16 illustrates one example of the multistage crosstalk correction processing.

The correction residual simulation of the inverse correction processing is performed based on, for example, the processing flow in FIG. 16. The cost evaluation unit 12 performs crosstalk simulation by applying the left eye corrected image $LI_c$ and the right eye corrected image $R_c$ obtained by the inverse correction processing to a crosstalk model. The left eye perceptual image $LI_{view}$ and the right eye perceptual image $RI_{view}$ of the observer in a case where the left eye corrected image $LI_c$ and the right eye corrected image $RI_c$ are displayed on the screen SCR are simulated by the crosstalk simulation.

The cost evaluation unit 12 calculates a left eye correction residual ($LI_{org}$–$LI_{view}$) based on the difference between the left eye original image $LI_{org}$ and the left eye perceptual image $LI_{view}$. The cost evaluation unit 12 calculates a right eye correction residual ($RI_{org}$–$RI_{view}$) based on the difference between the right eye original image $RI_{org}$ and the right eye perceptual image $RI_{view}$. The correction processing unit 11 calculates the distribution of a blur amount used in the blurring processing for the left eye original image $LI_{org}$ based on the left eye correction residual. The correction processing unit 11 calculates the distribution of a blur amount used in the blurring processing for the right eye original image $RI_{org}$ based on the right eye correction residual.

Figure 17:
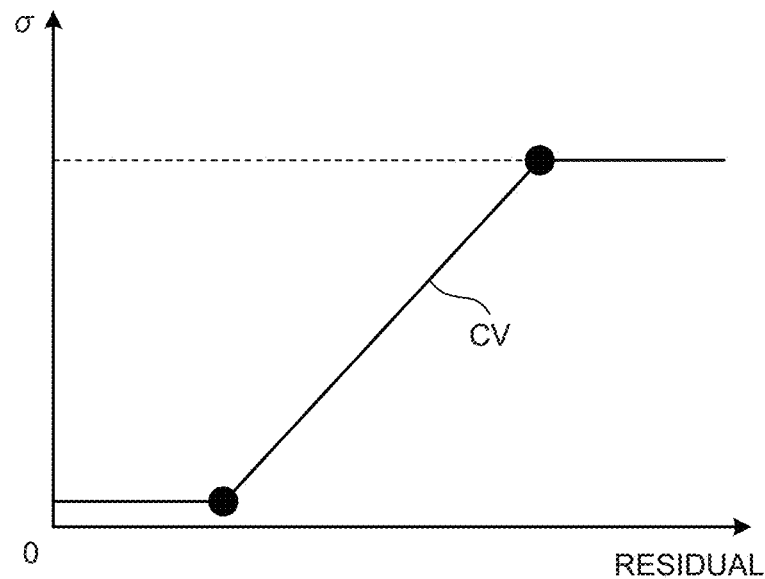
FIG. 17 illustrates one example of the multistage crosstalk correction processing.
Figure 18:
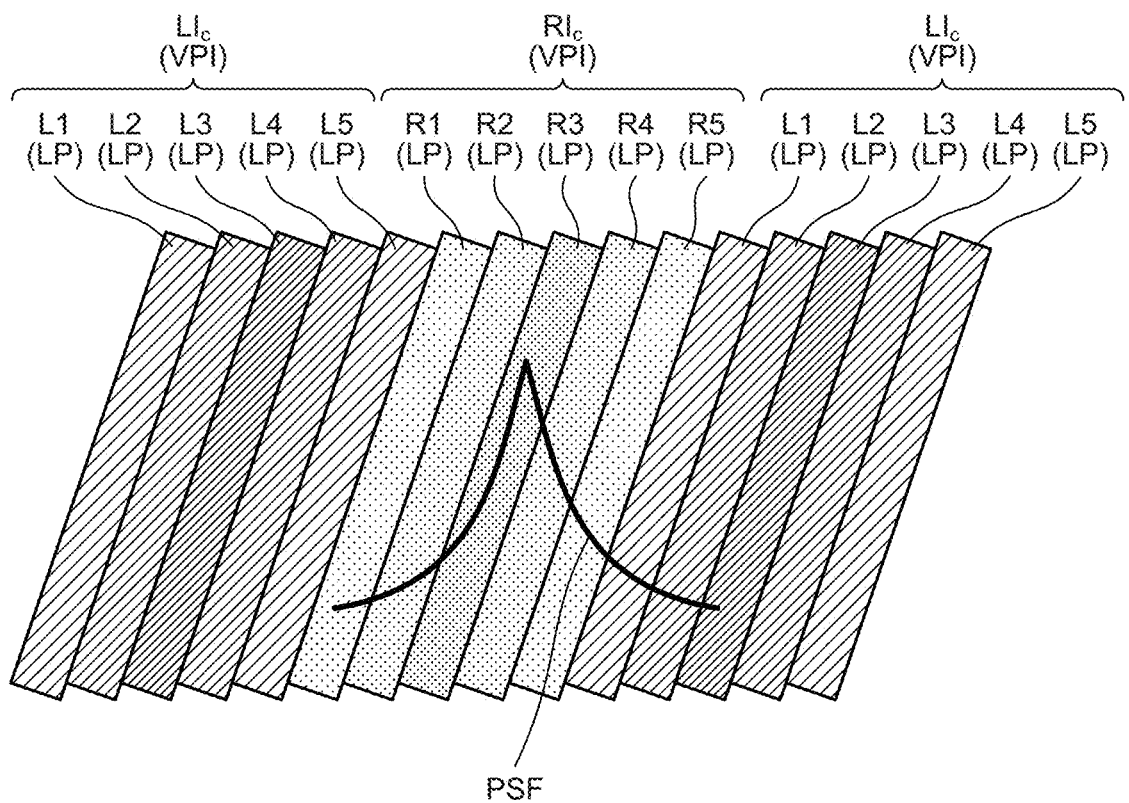
FIG. 18 illustrates one example of the multistage crosstalk correction processing.
Figure 19:
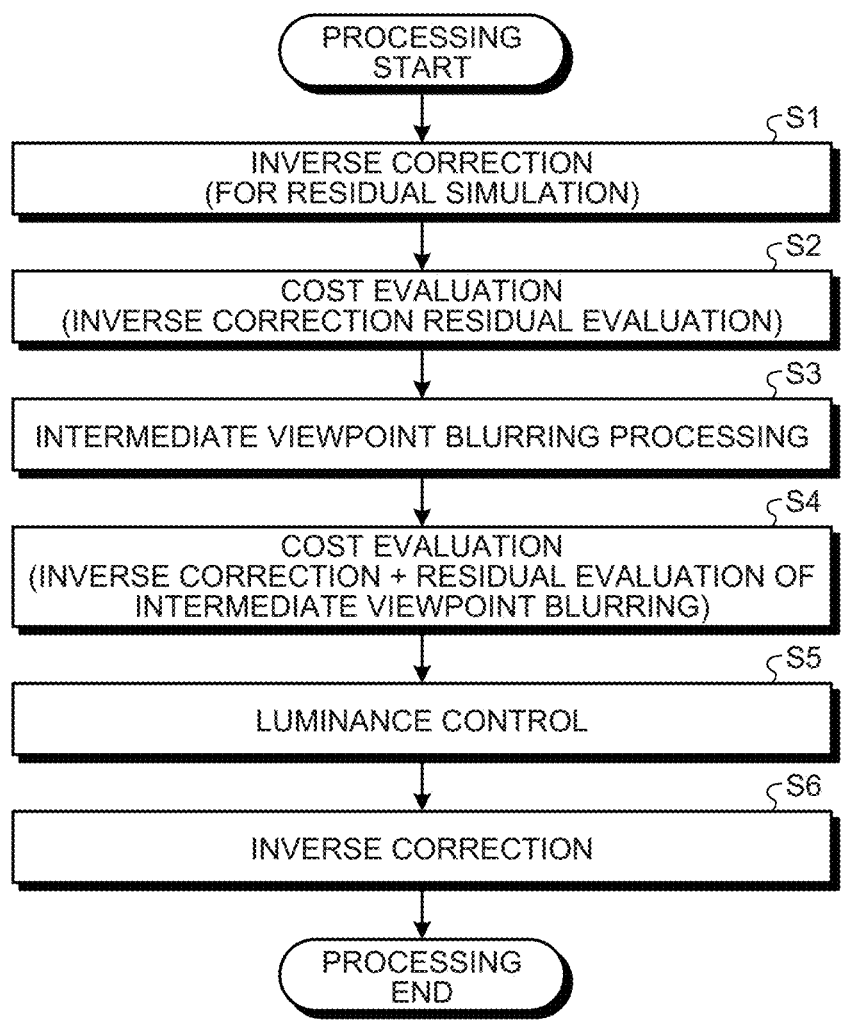
FIG. 19 illustrates one example of the multistage crosstalk correction processing.

The blur amount is calculated by using, for example, a correction curve CV in FIG. 17. The correction curve CV specifies the correspondence relation between a correction residual and a blur amount (e.g., standard deviation σ). FIG. 17 illustrates the correction curve CV as a curve in which the blur amount increases in proportion to an increase amount of the correction residual in a certain residual range and the blur amount is constant regardless of the value of the correction residual in other residual ranges. The correction curve CV is, however, not limited thereto. The shape of the correction curve CV is determined by, for example, a subjective evaluation of a designer in Step S7. Step S7 is performed by offline inspection.

In Step S4, the cost evaluation unit 12 simulates the perceptual image $IM_{view}$ after the blurring processing. For example, the cost evaluation unit 12 blurs the left eye corrected image $LI_c$ and the right eye corrected image $RI_c$ obtained by performing the inverse correction processing and the blurring processing on the original image $IM_{org}$ by using a point spread function PSF in FIG. 18. The point spread function PSF has a peak at the center of the viewpoint image VPI (center of lens LE). The cost evaluation unit 12 performs crosstalk simulation by applying the left eye corrected image $LI_c$ and the right eye corrected image $RI_c$ blurred by the point spread function PSF to a crosstalk model. The left eye perceptual image $LI_{view}$ and the right eye perceptual image $RI_{view}$ of the observer in a case where the left eye corrected image $LI_c$ and the right eye corrected image $RI_c$ are displayed on the screen SCR are simulated by the crosstalk simulation.

The cost evaluation unit 12 evaluates a correction residual after the blurring processing as the cost CS based on a simulation result. For example, the cost evaluation unit 12 calculates a left eye correction residual ($LI_{org}$–$LI_{view}$) based on the difference between the left eye original image $LI_{org}$ and the left eye perceptual image $LI_{view}$. The cost evaluation unit 12 calculates a right eye correction residual ($RI_{org}$–$RI_{view}$) based on the difference between the right eye original image $RI_{org}$ and the right eye perceptual image $RI_{view}$.

In Step S5, the correction processing unit 11 determines a correction range and a correction amount of the compression processing based on the cost CS obtained by the cost evaluation after the blurring processing. For example, the correction processing unit 11 determines an image region having the left eye correction residual and the right eye correction residual as the correction range of the compression processing. The correction processing unit 11 selects one or more local regions LBA with a pixel included in the correction range. The correction processing unit 11 calculates a range parameter for each selected local area LBA, and compresses the luminance range of the local region LBA based on the range parameter. The correction processing unit 11 does not perform the compression processing on a local region LBA with no pixel included in the correction range.

The correction processing unit 11 generates the local luminance compressed image BCI obtained by performing compression processing on one or more local regions LBA for the corrected image $IM_c$ subjected to the blurring processing. The correction processing unit 11 generates a plurality of local luminance compressed images BCI in which the setting positions of the local regions LBA are shifted. The correction processing unit 11 overlaps and averages the plurality of local luminance compressed images BCI. As a result, the corrected image $IM_c$ subjected to the blurring processing and the compression processing is generated.

In Step S6, the correction processing unit 11 performs the inverse correction processing on the corrected image $IM_c$ obtained in Step S5 to generate the output image $IM_{out}$. As a result, a display image with less deterioration in image quality due to crosstalk can be obtained.

The storage device 20 stores, for example, a program 29 executed by the processing device 10 and the parameter information 21. The program 29 causes a computer to execute information processing according to the present disclosure. The processing device 10 performs various pieces of processing in accordance with the program 29 stored in the storage device 20. The storage device 20 may be used as a work area for temporarily storing a processing result of the processing device 10. The storage device 20 includes any non-transitory storage medium, such as a semiconductor storage medium and a magnetic storage medium. The storage device 20 includes, for example, an optical disk, a magneto-optical disk, and a flash memory. The program 29 is stored in, for example, a non-transitory computer-readable storage medium.

The processing device 10 is, for example, a computer including a processor and a memory. The memory of the processing device 10 includes a random access memory (RAM) and a read only memory (ROM). The processing device 10 functions as the correction processing unit 11, the cost evaluation unit 12, the correction amount determination unit 13, and the corrected image generation unit 14 by executing the program 29.

[5. Effects]

The information processing apparatus 1 includes the cost evaluation unit 12 and the correction processing unit 11. The cost evaluation unit 12 evaluates a correction residual after crosstalk correction processing as the cost CS. The correction processing unit 11 performs a plurality of different pieces of crosstalk correction processing while determining the correction range and the correction amount based on the cost CS. In the information processing method of the present embodiment, the processing of the information processing apparatus 1 described above is executed by the computer. The program 29 of the present embodiment causes a computer to perform the processing of the information processing apparatus 1 described above.

According to the configuration, the correction residual can be reduced by a plurality of pieces of crosstalk correction processing performed in a multi-layered manner. Therefore, crosstalk is satisfactorily inhibited.

The correction processing unit 11 performs a plurality of pieces of crosstalk correction processing within a range in which the number of pieces of crosstalk correction processing does not exceed a preset number.

According to the configuration, image quality can be enhanced while an operation load in the crosstalk correction processing is inhibited.

The correction processing unit 11 performs inverse correction processing, compression processing, and blurring processing as the crosstalk correction processing. The inverse correction processing is crosstalk correction processing of performing conversion inverse to the conversion caused by crosstalk. The compression processing is crosstalk correction processing of compressing the luminance range of a correction range. The blurring processing is crosstalk correction processing of blurring an outer edge of a viewpoint image.

According to the configuration, side effects caused by the inverse correction processing can be reduced by the blurring processing and the compression processing. The blurring processing and the compression processing are greatly different from each other in terms of correction. Therefore, the crosstalk is inhibited more favorably by adjusting the contributions of the blurring processing and the compression processing.

The correction processing unit 11 determines a correction range and a correction amount of the blurring processing based on the cost obtained by the cost evaluation after the inverse correction processing. The correction processing unit 11 determines a correction range and a correction amount of the compression processing based on the cost obtained by the cost evaluation after the blurring processing.

According to the configuration, the blurring processing having a larger side effect on image quality than the compression processing is performed as the second crosstalk correction processing. Since the blurring processing has a large side effect on the image quality, the contribution of the blurring processing to the correction is set to be small. The final correction is performed by the third compression processing. Since the contribution of the blurring processing is small, the contribution of the compression processing becomes relatively large. Since the contribution of the compression processing having a small side effect increases, the deterioration in image quality caused by the side effects of the blurring processing and the compression processing is minimized.

The correction processing unit 11 decreases the correction amount of the blurring processing as the moving speed of the viewpoint position PS of the observer increases.

According to the configuration, the observer does not easily recognize a blur in an image caused by the blurring processing.

[6. Variations]

[6-1. First Variation]

Figure 20:
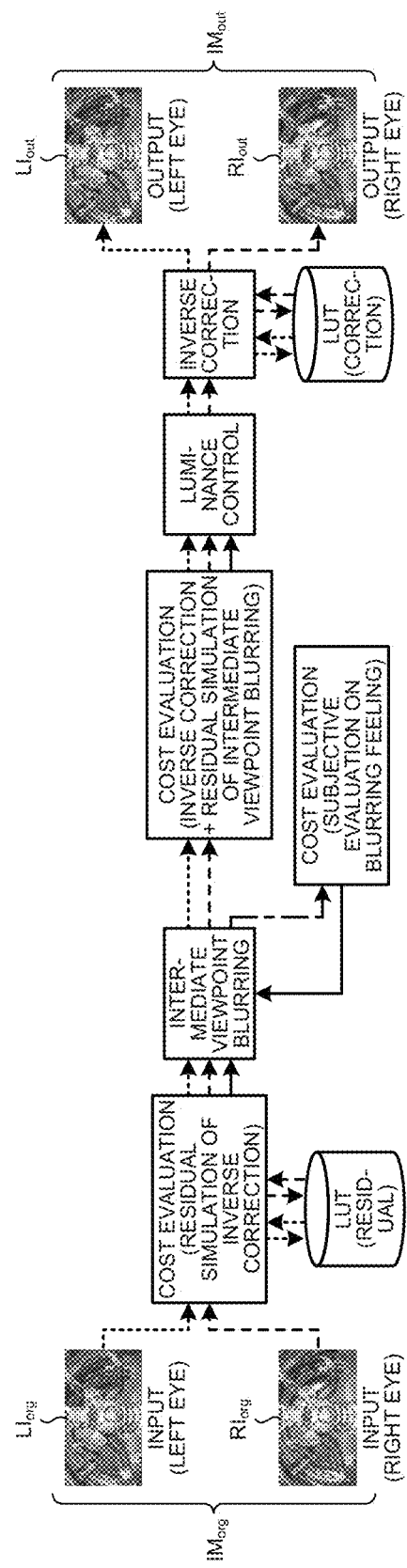
FIG. 20 illustrates a first variation of the multistage crosstalk correction processing.

FIG. 20 illustrates a first variation of the multistage crosstalk correction processing.

Figure 15:
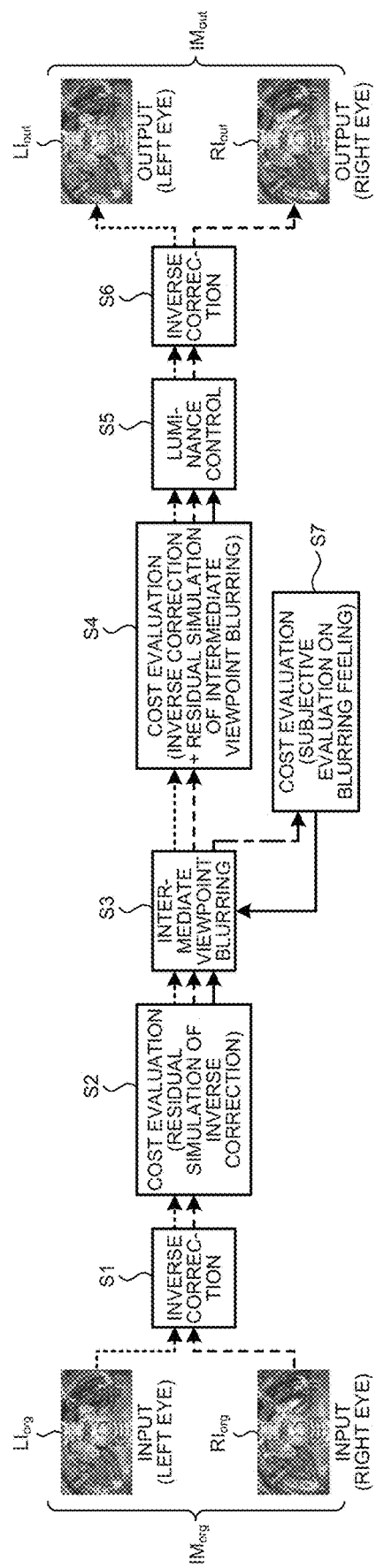
FIG. 15 illustrates one example of multistage crosstalk correction processing.

In the example of FIG. 15, the inverse correction processing is performed by performing numerical operation of the gamma processing, the inverse matrix operation processing, and the degamma processing. As illustrated in FIG. 20, however, the numerical operation can be omitted by preliminarily storing an operation result of the inverse correction processing as a lookup table LUT and referring to the lookup table LUT.

In the present variation, the calculation of the inverse correction processing in FIG. 3 is performed for all combinations of input signal values related to the left eye original image $L_{org}$ and the right eye original image $RI_{org}$. The gamma value γ and the mixing ratio α are preliminarily measured based on display characteristics and crosstalk characteristics. The lookup table LUT stores a combination of the input signal values and output signal values determined by the above-described calculation. The storage device 20 stores the lookup table LUT.

[6-2. Second Variation]

Figure 21:
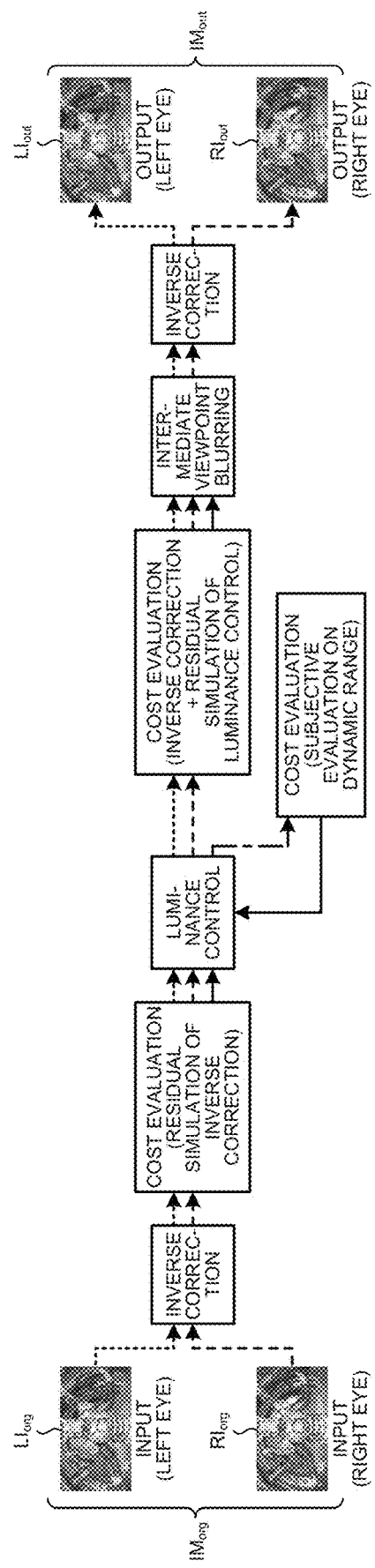
FIG. 21 illustrates a second variation of the multistage crosstalk correction processing.

FIG. 21 illustrates a second variation of the multistage crosstalk correction processing.

In the example of FIG. 15, the blurring processing, the compression processing, and the inverse correction processing are performed in this order. The order of the crosstalk correction processing is, however, not limited thereto. As illustrated in FIG. 21, the processing may be performed in the order of the compression processing, the blurring processing, and the inverse correction processing.

In the example of FIG. 21, the correction processing unit 11 determines a correction range and a correction amount of the compression processing based on the cost CS obtained by the cost evaluation after the inverse correction processing. The correction processing unit 11 determines a correction range and a correction amount of the blurring processing based on the cost CS obtained by the cost evaluation after the compression processing. Also in this case, the correction residual can be reduced by a plurality of pieces of crosstalk correction processing performed in a multi-layered manner. Therefore, crosstalk is satisfactorily inhibited.

[6-3. Third Variation]

Figure 22:
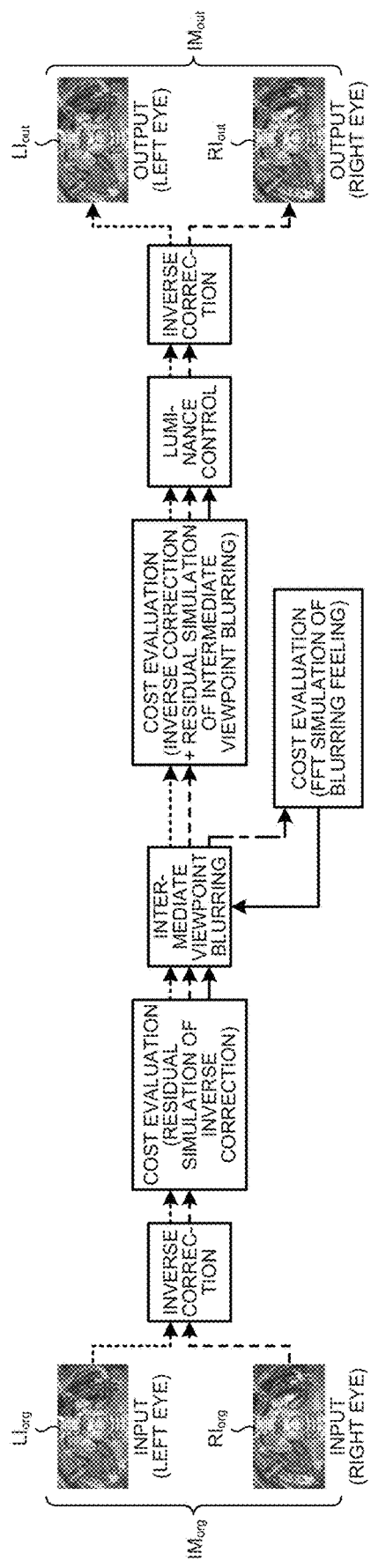
FIG. 22 illustrates a third variation of the multistage crosstalk correction processing.

FIG. 22 illustrates a third variation of the multistage crosstalk correction processing.

In the example of FIG. 15, the correction amount of the blurring processing is determined by using the correction curve CV determined by the subjective evaluation (Step S7) of the designer. The method of determining the correction amount of the blurring processing is, however, not limited thereto. For example, the correction amount of the blurring processing can be determined while a blurring feeling of a corrected image after the blurring processing is quantitatively evaluated and an evaluation result of the blurring feeling is fed back.

In the example of FIG. 22, the correction processing unit 11 performs the fast Fourier transform (FFT) on the corrected image $IM_c$ after the blurring processing. The correction processing unit 11 quantitatively evaluates the blurring feeling of the corrected image $IM_c$ based on a result of the FFT. When the corrected image has a large blur, a value of a high frequency component obtained by the FFT processing decreases. Therefore, the blurring feeling is quantitatively evaluated by providing a threshold for the value of the high frequency component. The correction processing unit 11 determines the correction amount of the blurring processing based on an evaluation result of the blurring feeling. According to the configuration, a blur amount of the corrected image can be set by objective evaluation.

[6-4. Fourth Variation]

Figure 23:
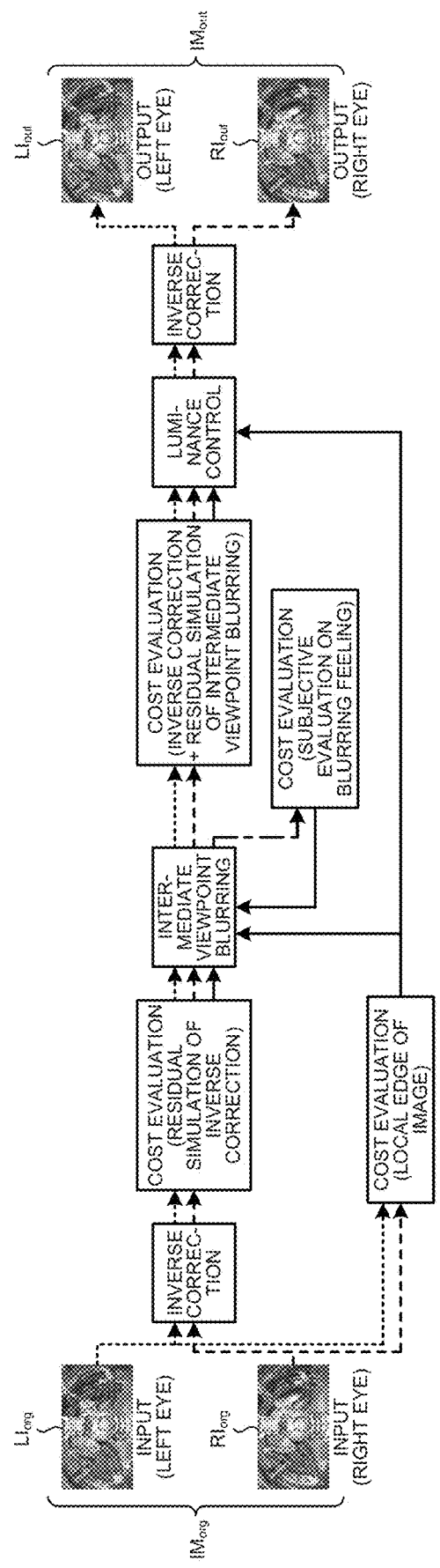
FIG. 23 illustrates a fourth variation of the multistage crosstalk correction processing.

FIG. 23 illustrates a fourth variation of the multistage crosstalk correction processing.

In the example of FIG. 15, cost evaluation is performed for all image regions in which a correction residual has occurred by the inverse correction processing. Crosstalk is, however, easily recognized mainly in an edge portion of an image. The edge portion has a large luminance difference between pixels adjacent via the boundary of the edge. Therefore, crosstalk easily occurs. Even if the crosstalk correction processing is performed, correction effects are not easily obtained since a signal value is easily saturated. Therefore, the crosstalk correction processing can be selectively performed on the edge portion.

In the example of FIG. 23, the cost evaluation unit 12 detects an edge portion from the original image $IM_{org}$. The edge portion is detected by using a known edge extraction filter, such as a Sobel filter, a Laplacian filter, and a Canny filter. The cost evaluation unit 12 evaluates only a correction residual of the edge portion of an image as the cost CS. According to the configuration, the image quality of the edge portion where the crosstalk is easily recognized is enhanced. Furthermore, since a correction range is limited to the edge portion, an operation load caused by the crosstalk correction processing is reduced.

[6-5. Fifth Variation]

Figure 24:
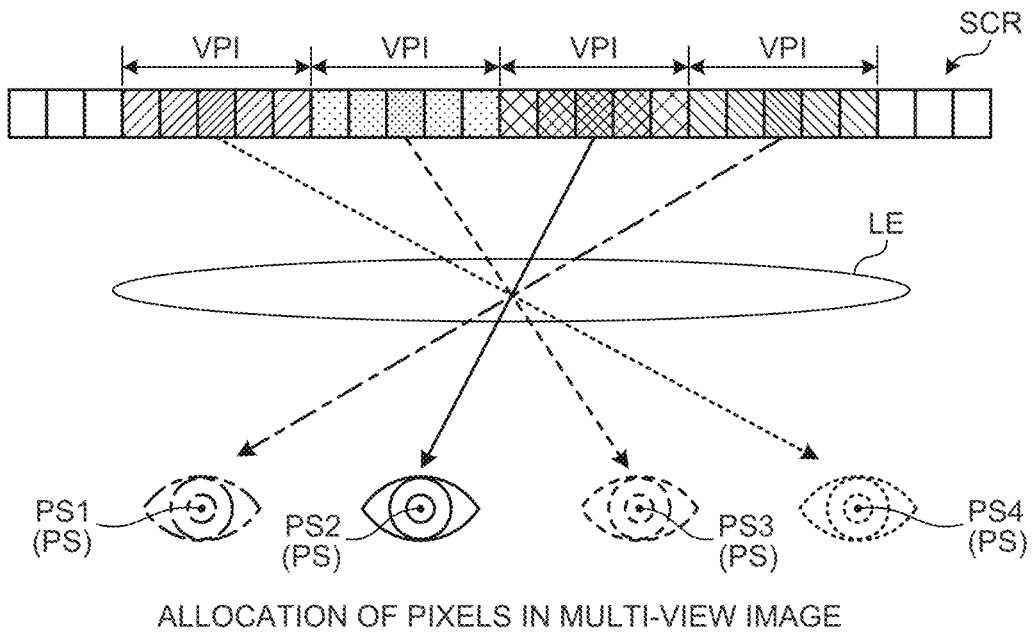
FIG. 24 illustrates another application example of the multistage crosstalk correction processing.
Figure 25:
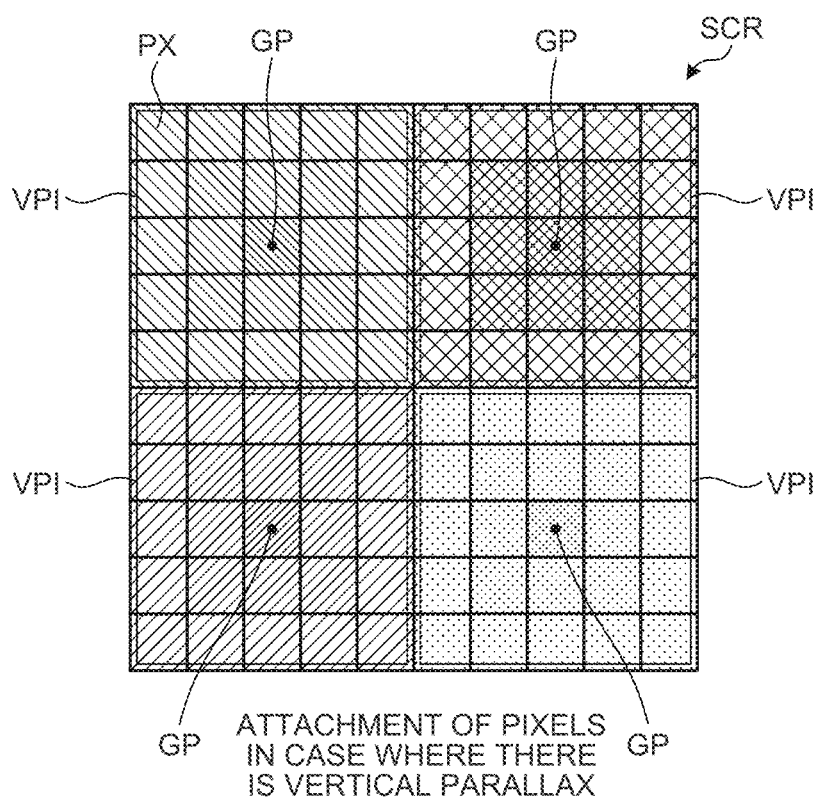
FIG. 25 illustrates another application example of the multistage crosstalk correction processing.

FIGS. 24 and 25 illustrate another application example of the multistage crosstalk correction processing.

In the above-described embodiment, the multistage crosstalk correction processing of the present disclosure is applied to a naked-eye 3D display. The information processing of the present disclosure may be, however, applied to a spectacle type 3D display.

The multistage crosstalk correction processing of the present disclosure can also be applied to crosstalk between three or more multiple viewpoints. Although, in the example of FIG. 24, the information processing of the present disclosure is applied to a display that displays four viewpoint images VPI, there may be three or five or more viewpoints. Although, in the example of FIG. 24, four viewpoint images VPI are distributed to a viewpoint position PS1, a viewpoint position PS2, a viewpoint position PS3, and a viewpoint position PS4 by a lenticular lens LE, a means for spatially separating the viewpoint images VPI is not limited to the lenticular lens LE. A parallax barrier can also be used as a space separating means. Furthermore, a projector array method can also be applied as a method of displaying a multi-view image.

In the example of FIG. 24, the parallax occurs only in a horizontal direction. Therefore, the four viewpoint images VPI corresponding to the viewpoint positions PS1 to PS4 are alternately displayed in the horizontal direction of the screen SCR. As illustrated in FIG. 25, however, the parallax may occur in two directions of the horizontal direction and the vertical direction. In this case, the four viewpoint images VPI are arranged in a matrix in the horizontal direction and the vertical direction of the screen SCR. The line image LP is a closed linear image such as a circle and a quadrangle. In the example of FIG. 25, the viewpoint image VPI is, for example, a square image. The line image LP is a quadrangular linear image centered on the gaze point GP. One viewpoint image VPI includes a plurality of pixels PX. The correction processing unit 11 determines the correspondence relation between a pixel group of the screen SCR and each viewpoint image VPI such that the center of the viewpoint image VPI corresponds to the gaze point GP. For example, the distribution of a blur amount is set as concentric distribution centered on the gaze point GP.

Note that the effects described in the present specification are merely examples and not limitations. Other effects may be obtained.

[Appendix]

Note that the present technology can also have the configurations as follows.

(1)
An information processing apparatus comprising:
a cost evaluation unit that evaluates a correction residual after crosstalk correction processing as a cost; and
a correction processing unit that performs a plurality of different pieces of crosstalk correction processing while determining a correction range and a correction amount based on the cost.

(2)
The information processing apparatus according to (1),
wherein the cost evaluation unit evaluates only the correction residual of an edge portion of an image as the cost.

(3)
The information processing apparatus according to (1) or (2),
wherein the correction processing unit performs a plurality of pieces of crosstalk correction processing within a range in which a number of pieces of the crosstalk correction processing does not exceed a preset number.

(4)
The information processing apparatus according to any one of (1) to (3),
wherein the correction processing unit performs, as the crosstalk correction processing: inverse correction processing of performing conversion inverse to conversion caused by crosstalk; compression processing of compressing a luminance range of the correction range; and a blurring processing of blurring an outer edge of a viewpoint image.

(5)
The information processing apparatus according to (4),
wherein the correction processing unit determines the correction range and the correction amount of the blurring processing based on the cost obtained by cost evaluation after the inverse correction processing, and determines the correction range and the correction amount of the compression processing based on the cost obtained by cost evaluation after the blurring processing.

(6)
The information processing apparatus according to (4) or (5),
wherein the correction processing unit performs fast Fourier transform (FFT) on a corrected image after blurring processing, quantitatively evaluates a blurring feeling of the corrected image based on a result of the FFT, and determines a correction amount of the blurring processing based on an evaluation result of the blurring feeling.

(7)
The information processing apparatus according to any one of (4) to (6),
wherein the correction processing unit decreases a correction amount of the blurring processing as a moving speed of a viewpoint position of an observer increases.

(8)
An information processing method executed by a computer, comprising:
evaluating a correction residual after crosstalk correction processing as a cost; and
performing a plurality of different pieces of crosstalk correction processing while determining a correction range and a correction amount based on the cost.

(9)
A program causing a computer to execute:
evaluating a correction residual after crosstalk correction processing as a cost; and
performing a plurality of different pieces of crosstalk correction processing while determining a correction range and a correction amount based on the cost.

REFERENCE SIGNS LIST

1 INFORMATION PROCESSING APPARATUS
11 CORRECTION PROCESSING UNIT
12 COST EVALUATION UNIT
CS COST

The invention claimed is:

1. An information processing apparatus, comprising:
circuitry configured to:
    perform a first piece of a plurality of pieces of crosstalk correction process on a first image;
    determine each of a plurality of simulation images based on a respective piece of the plurality of pieces of crosstalk correction process;
    determine each of a plurality of correction residuals based on the respective piece of the plurality of pieces of crosstalk correction process, wherein each of the plurality of correction residuals corresponds to a respective cost of a plurality of costs;
    determine each of a plurality of correction ranges and each of a plurality of correction amounts based on the respective cost of the plurality of costs; and
    perform each of the plurality of pieces of crosstalk correction process on a respective simulation image of the plurality of simulation images based on
        a respective correction range of the plurality of correction ranges, and
        a respective correction amount of the plurality of correction amounts.

2. The information processing apparatus according to claim 1, wherein
the circuitry is further configured to determine a respective correction residual of the plurality of correction residuals,
the respective correction residual of the plurality of correction residuals is associated with an edge portion of the first image, and the edge portion of the first image corresponds to the respective cost of the plurality of costs.

3. The information processing apparatus according to claim 1, wherein
the circuitry is further configured to perform the plurality of pieces of crosstalk correction process in a specific range, and
the specific range is associated with a number of pieces of the plurality of pieces of crosstalk correction process that is less than a specific number.

4. The information processing apparatus according to claim 1, wherein each piece of the plurality of pieces of crosstalk correction process includes:
an inverse correction process to perform a conversion inverse of a result associated with a crosstalk conversion;
a compression process to compress a luminance range of each of the plurality of correction ranges; and
a blurring process to blur an outer edge of a viewpoint image, wherein the viewpoint image is associated with the first image.

5. The information processing apparatus according to claim 4, wherein the circuitry is further configured to:
determine a first set of correction ranges of the plurality of correction ranges and a first set of correction amounts of the plurality of correction amounts based on the inverse correction process;
perform the blurring process based on the first set of correction ranges and the first set of correction amounts;
determine a second set of correction ranges of the plurality of correction ranges and a second set of correction amounts of the plurality of correction amounts based on the blurring process, wherein
the first set of correction ranges and the second set of correction ranges are different, and
the first set of correction amounts and the second set of correction amounts are different; and
perform the compression process based on the second set of correction ranges and the second set of correction amounts.

6. The information processing apparatus according to claim 5, wherein the circuitry is further configured to:
perform a fast Fourier transform (FFT) on a corrected image associated with the plurality of simulation images based on the blurring process;
determine a blurring feeling of the corrected image based on a result of the FFT on the corrected image; and
determine the second set of correction amounts based on the determined blurring feeling.

7. The information processing apparatus according to claim 5, wherein the circuitry is further configured to decrease each of the second set of correction amounts of the blurring process based on an increase in a moving speed of a viewpoint position of an observer.

8. An information processing method, comprising:
performing a first piece of a plurality of pieces of crosstalk correction process on a first image;
determining each of a plurality of simulation images based on a respective piece of the plurality of pieces of crosstalk correction process;
determining each of a plurality of correction residuals based on the respective piece of the plurality of pieces of crosstalk correction process, wherein
each of the plurality of correction residuals corresponds to a respective cost of a plurality of costs;
determining each of a plurality of correction ranges and each of a plurality of correction amounts based on the respective cost of the plurality of costs; and
performing each of the plurality of pieces of crosstalk correction process on a respective simulation image of the plurality of simulation images based on
a respective correction range of the plurality of correction ranges, and
a respective correction amount of the plurality of correction amounts.

9. A non-transitory computer-readable medium having stored thereon, computer-executable instructions which, when executed by a computer, cause the computer to execute operations, the operations comprising:
performing a first piece of a plurality of pieces of crosstalk correction process on a first image;
determining each of a plurality of simulation images based on a respective piece of the plurality of pieces of crosstalk correction process;
determining each of a plurality of correction residuals based on the respective piece of the plurality of pieces of crosstalk correction process, wherein
each of the plurality of correction residuals corresponds to a respective cost of a plurality of costs;
determining each of a plurality of correction ranges and each of a plurality of correction amounts based on the respective cost of the plurality of costs; and
performing each of the plurality of pieces of crosstalk correction process on a respective simulation image of the plurality of simulation images based on
a respective correction range of the plurality of correction ranges, and
a respective correction amount of the plurality of correction amounts.

* * * * *